United States Patent
Yasui et al.

(10) Patent No.: US 9,599,177 B2
(45) Date of Patent: Mar. 21, 2017

(54) VEHICLE ELECTRIC BRAKING DEVICE

(71) Applicants: Yoshiyuki Yasui, Nagoya (JP); Shinichiro Yukoku, Seto (JP); Naomi Emura, Kariya (JP)

(72) Inventors: Yoshiyuki Yasui, Nagoya (JP); Shinichiro Yukoku, Seto (JP); Naomi Emura, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/763,466

(22) PCT Filed: Jan. 27, 2014

(86) PCT No.: PCT/JP2014/051686
§ 371 (c)(1),
(2) Date: Jul. 24, 2015

(87) PCT Pub. No.: WO2014/115874
PCT Pub. Date: Jul. 31, 2014

(65) Prior Publication Data
US 2015/0362033 A1 Dec. 17, 2015

(30) Foreign Application Priority Data

Jan. 25, 2013 (JP) ................................. 2013-011993
Jan. 25, 2013 (JP) ................................. 2013-011997
Jan. 25, 2013 (JP) ................................. 2013-011998

(51) Int. Cl.
*F16D 65/18* (2006.01)
*F16H 57/04* (2010.01)
(Continued)

(52) U.S. Cl.
CPC .......... *F16D 65/18* (2013.01); *F16D 55/225* (2013.01); *F16D 55/226* (2013.01);
(Continued)

(58) Field of Classification Search
CPC .......... F16D 65/14; F16D 65/18; F16D 65/28; F16D 55/02; F16D 55/22; F16D 55/224;
(Continued)

(56) References Cited

U.S. PATENT DOCUMENTS 6,397,981 B1 6/2002 Tamasho et al.
6,607,059 B1 * 8/2003 Kapaan .................. F16D 65/18
188/72.8

(Continued)

FOREIGN PATENT DOCUMENTS

JP 08-296674 A 11/1996
JP 10-26215 A 1/1998
(Continued)

OTHER PUBLICATIONS

International Search Report (PCT/ISA/210) mailed on July Apr. 28, 2014, by the Japanese Patent Office as the International Searching Authority for International Application No. PCT/JP20/151686.
(Continued)

*Primary Examiner* — Thomas J Williams
(74) *Attorney, Agent, or Firm* — Buchanan Ingersoll & Rooney PC

(57) ABSTRACT

Rotational motion of a shaft member rotationally driven by a motor is converted by a screw member into translational motion of a pressing member. An outer periphery of a cap member is brought into slide contact with a first cylindrical part of the pressing member so that the cap member is relatively movable in an axial direction of the pressing member and is relatively unrotatable about its axis. An inner periphery of the cap member is brought into slide contact with a second cylindrical part of the shaft member so that the cap member is relatively movable in an axial direction of the shaft member and is relatively rotatable about its axis. The first cylindrical part, the second cylindrical part, and the cap (Continued)

member partition a storage chamber connected to one end of the screw member, and a lubricant for lubricating the screw member is filled inside the storage chamber.

7 Claims, 9 Drawing Sheets

(51) Int. Cl.
*F16D 55/225* (2006.01)
*F16D 55/226* (2006.01)
*F16H 25/24* (2006.01)
*F16D 121/24* (2012.01)
*F16D 125/40* (2012.01)

(52) U.S. Cl.
CPC ..... *F16H 57/0497* (2013.01); *F16D 2121/24* (2013.01); *F16D 2125/40* (2013.01); *F16H 25/24* (2013.01)

(58) Field of Classification Search
CPC .. F16D 55/225; F16D 55/226; F16D 2121/24; F16D 2125/40
USPC .......................... 188/156, 157, 158, 161, 162
See application file for complete search history.

(56) References Cited

U.S. PATENT DOCUMENTS

| | | | |
|---|---|---|---|
| 6,666,308 B1 * | 12/2003 | De Vries | F16D 65/18 188/156 |
| 6,691,837 B1 * | 2/2004 | Kapaan | F16D 65/18 188/156 |
| 2010/0313689 A1 | 12/2010 | Quenerch'du et al. | |

FOREIGN PATENT DOCUMENTS

| | | |
|---|---|---|
| JP | 2001-80495 A | 3/2001 |
| JP | 2001-080495 A | 3/2001 |
| JP | 2005-273680 A | 10/2005 |
| JP | 2007-247681 A | 9/2007 |
| JP | 2012-002316 A | 1/2012 |

OTHER PUBLICATIONS

Written Opinion (PCT/ISA/237) mailed on July Apr. 28, 2014, by the Japanese Patent Office as the International Searching Authority for International Application No. PCT/JP20/151686.

* cited by examiner (ii) STATE IN WHICH PRESSING MEMBER IS RETRACTED (STATE IN WHICH PRESSING FORCE IS ZERO, AND WHICH CORRESPONDS TO FIG. 5(c))

(i) STATE IN WHICH PRESSING MEMBER IS PRESSED BY FRICTION MEMBER (STATE IN WHICH PRESSING FORCE IS GENERATED, AND WHICH CORRESPONDS TO FIG. 5(a))

VEHICLE ELECTRIC BRAKING DEVICE

TECHNICAL FIELD

The present invention relates to a vehicle electric braking device.

BACKGROUND ART

In Patent Literature 1, there is a description that, in an electric braking device using an electric motor, in order to "carry out a smooth swing motion of a piston during braking," "a spherical surface is formed at a portion of a pressing member to be engaged with a piston, and grease is filled between the spherical surface and an abutment part of the piston; after the braking force for the wheel is released, the electric motor is rotated backward, to thereby move the nut in a direction away from the piston so that the pressing member is brought into a free state to form a clearance between the spherical surface and the abutment part" (refer to Abstract and the like of Patent Literature 1).

In Patent Literature 2, there is a description that, in an electric braking device using an electric motor, in order to "avoid, on a ball screw configured to convert a rotation of the motor into a translational motion to move brake pads, the absence of an oil film caused by a repeated movement in a specific extent, and an increase in a friction thereof," "when a vehicle stops and a brake pedal is released, the brake pads for the respective wheels are simultaneously moved toward a pressing release side until a nut opposes a position beyond a usage section of a screw shaft in a normal brake operation, and are then returned to a neutral position; and the brake pads are sequentially moved to a pressing side for each wheel, and are then returned to the neutral position" (refer to Abstract and the like of Patent Literature 2).

This configuration is intended to maintain an appropriate lubrication state in a manner that "balls of the nut in contact with the section of the screw shaft other than the normal usage section are brought into contact with the normal usage section of the screw shaft, and hence the lubricant is supplied to the normal usage section of the screw shaft via the balls of the nut, to thereby recover the oil film in the normal usage section of the screw shaft."

In Patent Literature 3, there is a description that, in order to "prevent extraneous substances from entering from the outside into a nut of a ball screw, and to prevent a lubricant in the nut from leaking to the outside," "in a seal device, a pair of annular seals each attached on an end part of the nut of the ball screw and having an elastically deformable seal lip are arranged with a predetermined gap by an annular spacer, a seal lip inner diameter contour of the seal is formed into a shape similar to a vertical cross-sectional shape of the screw shaft, and has a diametrical dimension slightly smaller than an outer diameter of the screw shaft; and a space between both the seals on the inner diameter side of the spacer serves as a lubricant filling space" (refer to Abstract and the like of Patent Literature 3).

In the electric braking device using the electric motor disclosed in Patent Literature 1, lubrication of a so-called "universal joint mechanism (for example, a spherical surface and an abutment part)" as well as lubrication of "a rotation/translation conversion mechanism (for example, a screw member)" is important. Therefore, in the device disclosed in Patent Literature 2, the "ball screw" is employed as the rotation/translation conversion mechanism, and the operation of moving the brake pads beyond the normal usage range (so-called "retraction of ball screw") is carried out, thereby adjusting the lubrication state of the screw shaft. However, in order to improve the lubrication state of the screw, in addition to the retraction operation, considerations need to be taken for the lubrication of the screw itself.

Patent Literature 3 describes the seal device for the ball screw used as an operation part for a moving device and a positioning device in a machine tool and the like. In those devices, maintenance using grease and the like may be periodically carried out. For the vehicle electric braking device, the lubrication state of the screw needs to be maintained longer than in the machine tool and the like.

CITATION LIST

Patent Literature

[PTL 1] JP 2012-2316 A
[PTL 2] JP 2001-80495 A
[PTL 3] JP 2005-273680 A

SUMMARY OF INVENTION

The present invention has been made in view of the above-mentioned problems, and therefore has an object to provide a rotation/translation conversion mechanism (screw member) for a vehicle electric braking device, which is capable of maintaining a satisfactory lubrication state over a long period.

According to the present invention, there is provided a vehicle electric braking device configured to press a friction member (MSB) via/with/using an electric motor (MTR) against a rotation member (KTB) fixed to a wheel (WHL) of a vehicle, to thereby generate a braking torque for the wheel (WHL).

The device includes: a pressing member (PSN) configured to press the friction member (MSB) against the rotation member (KTB), the pressing member (PSN) including a first cylindrical part (Et1) on an inner periphery thereof; a shaft member (SFT) to be rotationally driven by the electric motor (MTR), the shaft member (SFT) including, on an outer periphery thereof, a second cylindrical part (Et2) overlapping the first cylindrical part (Et1) in an axial direction (Jsf direction) of the shaft member; and a screw member (NJB) configured to convert a rotational motion of the shaft member (SFT) into a translational motion of the pressing member (PSN).

One feature of this device resides in that the device further includes: a cap member (CAP) that is brought into slide contact with the first cylindrical part (Et1) on an outer periphery of the cap member (CAP) so that the cap member (CAP) is relatively movable in an axial direction (Jps direction) of the pressing member (PSN) with respect to the pressing member (PSN), and is brought into slide contact with the second cylindrical part (Et2) on an inner periphery of the cap member (CAP) so that the cap member (CAP) is relatively movable in the axial direction (Jsf direction) of the shaft member (SFT) with respect to the shaft member (SFT), the cap member (CAP) being relatively rotatable about an axis (about Jsf) of the shaft member (SFT) with respect to at least one of the first cylindrical part (Et1) or the second cylindrical part (Et2); and a storage chamber (Hch) partitioned by the first cylindrical part (Et1), the second cylindrical part (Et2), and the cap member (CAP), connected/communicated to one end (Pa2, Pb2) of the screw member (NJB), and filled with a lubricant (GRS) for lubricating the screw member (NJB).

In this case, it is preferred that: the pressing member (PSN) have a cup shape including an internal space that is open on one side in the axial direction (Jps direction) and closed on another side in the axial direction (Jps direction), and an inner peripheral surface of a side wall part of the cup shape correspond to the first cylindrical part (Et1); one end part of the shaft member (SFT) be arranged in the internal space, and an outer peripheral surface of the one end part of the shaft member (SFT) correspond to the second cylindrical part (Et2); and the storage chamber (Hch) be arranged in the internal space in a region on an opposite side of the opening with respect to the cap member (CAP).

In general, a main reason for the degradation of the lubrication state of the screw member is that gas (air) enters between abutment parts (for example, a clearance between a flank of a female thread and a flank of a male thread) of the screw member used for power transmission, thereby exhausting a lubricant (for example, grease) between the abutment parts. Thus, the lubrication state of the screw member can be appropriately maintained by suppressing the entrance of the gas between the abutment parts of the screw member so as to supply sufficient lubricant between the abutment parts.

Based on this knowledge, in the device according to the present invention, the partitioned space (storage chamber) configured to store the lubricant is formed at the end part of the screw member, and the lubricant is filled in the storage chamber. The storage chamber is partitioned by the cap member that has the outer periphery in slide contact with the first cylindrical part (the inner peripheral part of the pressing member) and the inner periphery in slide contact with the second cylindrical part (the outer peripheral part of the shaft member). In the space (storage chamber) partitioned in this way, the lubricant is filled.

According to the above-mentioned configuration, the slide contact parts between the cap member and the first and second cylindrical parts may serve as inflow passages of the gas, but those parts are cylindrical shapes (shapes with a generatrix) formed by straight lines. In other words, the seal surface is formed by a set of straight lines (for example, a cylindrical shape) in the axial direction, and hence the lubricant can be sealed in a highly hermetic manner. As a result, the inflow of the gas from the outside into the storage chamber can be suppressed. Note that, in the seal device disclosed in Patent Literature 3, the seal is carried out at the ball grooves, and the seal parts are formed by curves (that is, no generatrix exists).

Moreover, in the above-mentioned configuration, the pressing member is moved in the axial direction (moved forward or backward with respect to the rotational member) in order to adjust the braking torque of the wheel. As a result of this movement, the screw member may also move forward or backward, and hence a volume change may be generated in the storage chamber. In addition, the friction members gradually wear when used continuously. The wear of the friction members also generates the volume change of the storage chamber. According to the above-mentioned configuration, the cap member can be slidingly moved in the axial direction with respect to the first and second cylindrical parts, and hence the volume change of the storage chamber can be absorbed. As a result, the seal state by the cap member can be satisfactorily maintained over a long period, and an operation efficiency of the entire electric braking device can be secured over a long period.

This device includes: a pressing member (PSN) configured to press the friction member (MSB) against the rotation member (KTB); a shaft member (SFT) to be rotationally driven by/with the electric motor (MTR); and a screw member (NJB) configured to convert a rotational motion of the shaft member (SFT) into a translational motion of the pressing member (PSN).

Features of this device reside in that: the device further includes a sealed chamber (Hmp), which is a sealed space connected/communicated to one end (Pb1) of the screw member (NJB), the sealed space being filled with a lubricant (GRS) for lubricating the screw member (NJB); and the lubricant (GRS) moves between the sealed chamber (Hmp) and the screw member (NJB) via/through a thread clearance(s) (Cfk, Csm, Cso, Cmn, Cms, Cns) of the screw member (NJB) in response to the rotation of the shaft member (SET).

In this case, it is preferred that: the pressing member (PSN) have a cup shape including an internal space that is open on one side in an axial direction (Jps direction) of the pressing member (PSN) and closed on another side in the axial direction (Jps direction); one end part of the shaft member (SFT) be arranged in the internal space; and the sealed chamber (Hmp) be partitioned by an inner wall surface of the cup shape of the pressing member (PSN) or a wall surface of the one end part of the shaft member (SFT).

According to the above-mentioned configuration, the sealed chamber filled with the lubricant (grease) is formed at the one end part of the screw member. When the shaft member is rotated, the rotational motion is converted into the translational motion by the screw member. The translational motion of the screw member generates the volume change (increase or decrease in the volume) of the sealed chamber. In addition, thread clearances (such as a flank clearance of a trapezoidal screw and a groove clearance of a ball screw) are formed in the screw member. The lubricant is filled and sealed in the sealed chamber, and this volume change moves the lubricant inside the screw member. Specifically, when the volume of the sealed chamber decreases, the lubricant moves from the sealed chamber to the screw member. Conversely, when the volume of the sealed chamber increases, the lubricant moves from the screw member to the sealed chamber. The lubricant is renewed by the movement of the lubricant inside the screw member. As a result, a satisfactory lubrication state of the screw member can be maintained over a long period.

One feature of this device resides in that the device includes: a pressing member (PSN) configured to press the friction member (MSB) against the rotation member (KTB), and including a first cylindrical part (Et1) on an inner periphery thereof; a shaft member (SFT) to be rotationally driven by/with the electric motor (MTR), and including, on an outer periphery thereof, a second cylindrical part (Et2) overlapping the first cylindrical part (Et1), and on an inner periphery thereof, a third cylindrical part (Et3); a screw member (NJB) arranged inside the third cylindrical part (Et3), and configured to convert a rotational motion of the shaft member (SFT) into a translational motion of the pressing member (PSN); and a storage chamber (Hch) partitioned by the first cylindrical part (Et1) and the second cylindrical part (Et2), connected/communicated to one end (Pb2, Pc2) of the screw member (NJB), and filled with a lubricant (GRS) for lubricating the screw member (NJB).

In this case, it is preferred that: the pressing member (PSN) have a first cup shape including a first internal space that is open on one side in the axial direction (Jps direction) and closed on another side in the axial direction (Jps direction), and an inner peripheral surface of a side wall part of the first cup shape correspond to the first cylindrical part (Et1); one end part of the shaft member (SFT) be arranged in the first internal space; the one end part of the shaft member (SFT) have a second cup shape including a second internal space that is open at an end part in the axial direction (Jsf direction) and closed on an opposite side of the end part in the axial direction (Jsf direction), and an outer peripheral surface and an inner peripheral surface of a side wall part of the second cup shape respectively correspond to the second cylindrical part (Et2) and the third cylindrical part (Et3); the storage chamber (Hch) be arranged in the first internal space; and the screw member (NJB) be arranged in the second internal space.

In the above-mentioned configuration, the one end part of the shaft member is inserted into the first internal space of the pressing member so that the opening of the pressing member and the opening of the one end part of the shaft member oppose each other. As a result, in the first internal space, the part (overlapping part) in which the first cylindrical part of the pressing member and the second cylindrical part of the shaft member overlap each other in the axial direction is formed. Moreover, the screw member is arranged at the one end part of the shaft member in the second internal space. In the first internal space, the storage chamber that includes the overlapping part and is connected/communicated to the one end of the screw member is formed. The lubricant is filled in this storage chamber.

In general, the main reason for the degradation of the lubrication state of the screw member NJB is that gas (air) enters between the abutment parts (for example, the clearance between the flank of the female thread and the flank of the male thread) of the screw member NJB used for power transmission, thereby exhausting the lubricant between the abutment parts. Thus, the lubrication state of the screw member can be appropriately maintained by suppressing the entrance of the gas between the abutment parts of the screw member so as to supply sufficient lubricant between the abutment parts.

According to the construction of the present invention, the one end part of the shaft member is inserted into a deep part of the pressing member (piston), thereby forming the overlapping part. Additionally, the screw member is arranged at the one end part of the shaft member in the second internal space. Thus, without extending an overall length of the braking means (brake actuator), a path for the gas to pass from the screw member to gas parts (parts (spaces) in which the gas exists such as the part Pb4 in FIG. 2 to be described later) (for example, a path in FIG. 2 from the end part Pb2 of the screw member to the gas part Pb4) may be sufficiently secured. As a result, the entrance of the gas (air) from the gas part to the screw member can be suppressed, and the lubrication of the screw member NJB can be satisfactorily maintained over a long period.

DESCRIPTION OF EMBODIMENTS

Figure 1:
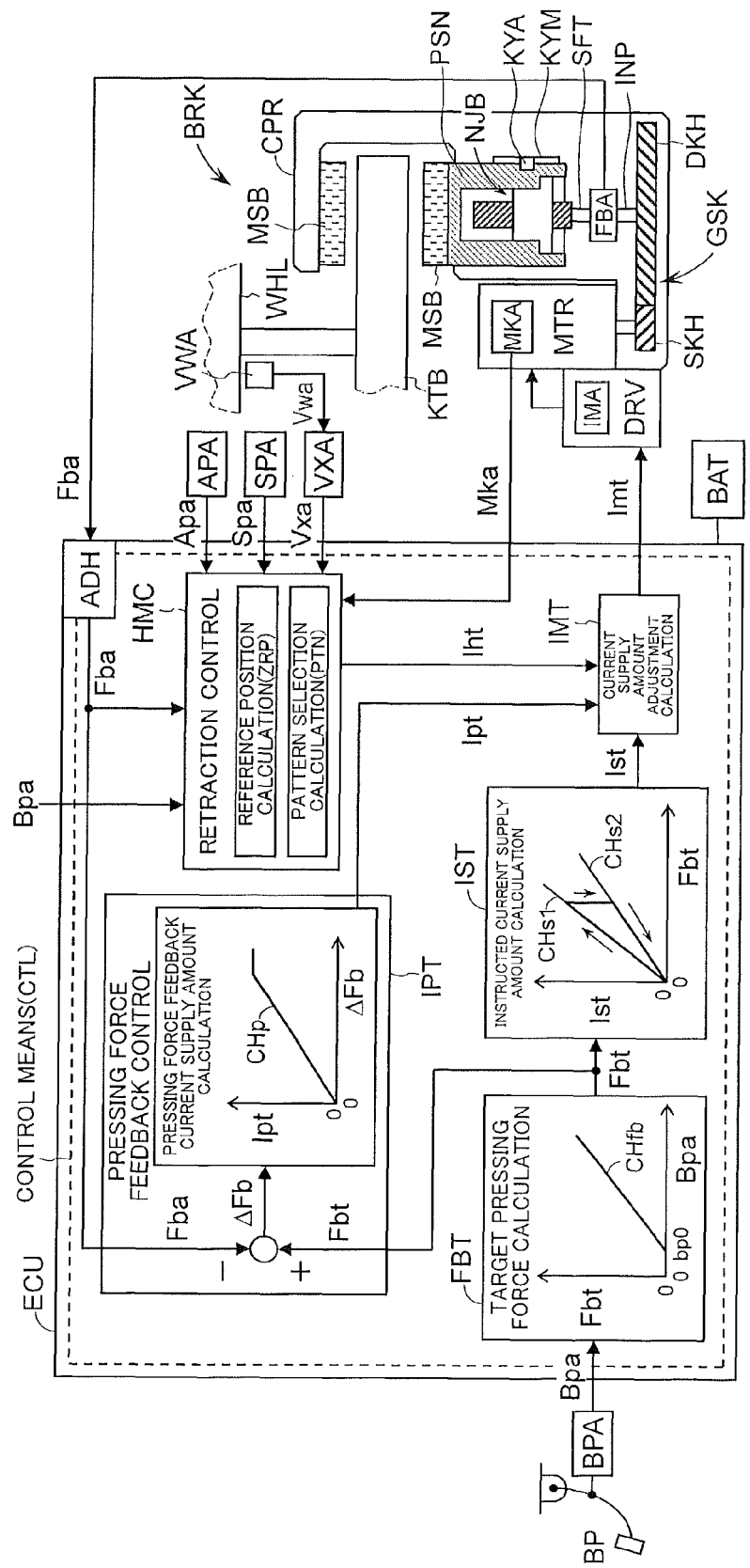
FIG. 1 is a schematic configuration diagram of an entire electric braking device according to embodiments of the present invention.

A description is now given of a vehicle electric braking device according to an embodiment of the present invention referring to the drawings.

<Overall Structure of Vehicle Electric Braking Device of the Present Invention>

As illustrated in FIG. 1, a vehicle including this electric braking device comprises a braking operation member BP, an electronic control unit ECU, braking means (brake actuator) BRK, and a storage battery BAT.

The braking operation member (for example, the brake pedal) BP is a member operated by the driver for decelerating the vehicle. Based on the operation amount of BP, the barking means (brake actuator) BRK adjusts a braking torque on a wheel WHL to generate a braking force on the wheel WHL.

Braking operation amount acquisition means BPA is provided to the braking operation member BP. The braking operation amount acquisition means BPA acquires (detects) the operation amount (braking operation amount) Bpa of the braking operation member BP operated by the driver. As the braking operation amount acquisition means BPA, one or more of a sensor (pressure sensor) for detecting a pressure of a master cylinder (not shown), a sensor (brake pedal depressing force sensor) for detecting an operation force of the braking operation member BP, and a sensor (brake pedal stroke sensor) for detecting a displacement amount of the braking operation member BP may be employed. Thus, the braking operation amount Bpa is calculated based on at least one of the master cylinder pressure, the brake pedal depressing force, and the brake pedal stroke. The braking operation amount Bpa is input to the electronic control unit ECU. Note that, the braking operation amount Bpa may be calculated or acquired by another electronic control unit (for example, an electronic control unit of steering control or an electronic control unit of powertrain control), and a calculated value (signal) thereof may be transmitted to ECU via a communication bus.

The electronic control unit ECU internally includes programmed control means (control algorithm) CTL for controlling the braking means BRK, and controls BRK based on CTL. The storage battery (battery) BAT is an electric power supply for supplying the electric power to BRK, ECU, and the like.

[Control Means CTL]

The control means CTL includes a target pressing force calculation block FBT, an instructed current supply amount calculation block IST, a pressing force feedback control block IPT, a retraction control block HMC, and a current supply amount adjustment calculation block IMT. The control means (control program) CTL is programmed inside the electronic control unit ECU.

In the target pressing force calculation block FBT, a target pressing force Fbt for each wheel WHL is calculated based on the braking operation amount Bpa and a target pressing force calculation characteristic (calculation map) CHfb set in advance. Fbt is a target value of a pressing force, which is a force applied by friction members (brake pads) MSB to press a rotation member (brake disk) KTB in the electric braking means BRK.

In the instructed current supply amount calculation block IST, an instructed current supply amount Ist is calculated based on calculation characteristics (calculation map) CHs1 and CHs2 of the instructed current supply amount that are set in advance, and the target pressing force Fbt. Ist is a target value of the current supply amount to the electric motor MTR for driving the electric motor MTR in the electric braking means BRK to achieve the target pressing force Fbt. The calculation map for Ist includes the two characteristics CHs1 and CHs2 in consideration of hysteresis of the electric braking means BRK. The characteristic CHs1 corresponds to a case in which the pressing force is increased, and the characteristic CHs2 corresponds to a case in which the pressing force is decreased. Therefore, as compared with the characteristic CHs2, the characteristic CHs1 is set to output a relatively large instructed current supply amount Ist.

The current supply amount is a state amount (variable) for controlling the output torque of the electric motor MTR. The electric motor MTR outputs a torque approximately proportional to the current, and hence a current target value for the electric motor MTR may be used as the target value of the current supply amount. Moreover, when a voltage supplied to the electric motor MTR is increased, the current is increased as a result, and hence the supplied voltage value may be used as the target current supply amount. Further, the supplied voltage value can be adjusted by a duty ratio in the pulse width modulation (PWM), and hence the duty ratio may be used as the current supply amount.

In the pressing force feedback control block IPT, a pressing force feedback current supply amount Ipt is calculated based on the target pressing force (target value) Fbt and an actual pressing force (actual value) Fba. The instructed current supply amount Ist is calculated as a value corresponding to the target pressing force Fbt, but an error (steady state error) may be generated between the target pressing force Fbt and the actual pressing force Fba due to an efficiency variation in the electric braking means BRK. The pressing force feedback current supply amount Ipt is calculated based on a deviation (pressing force deviation) AFb between the target pressing force Fbt and the actual pressing force Fba and a calculation characteristic (calculation map) CHp set in advance, and is determined so as to decrease the above-mentioned error. Note that, the actual pressing force Fba is acquired (detected) by pressing force acquisition means FBA which will be described later, and is input to IPT via analog/digital conversion means ADH provided in ECU.

In the retraction control block HMC, a target current supply amount (retraction current supply amount) Iht for carrying out a retraction operation of the screw is calculated based on the braking operation amount Bpa. The retraction operation of the screw is to adjust an "abutment state (a contact state between flanks for a case of a trapezoidal screw, and a contact state between balls and grooves for a case of a ball screw)" in a screw member NJB. In the retraction control block HMC, when a braking operation is not being carried out (that is, in a state in which Bpa=0), the retraction operation is carried out by a backward rotation of the electric motor MTR. As the retraction current supply amount Iht during a continuation of the retraction control, a current supply amount (predetermined value) iht1 set in advance is used as a target value. When an end of the retraction control is determined, the retraction current supply amount Iht is set to zero.

The retraction control block HMC includes a reference position calculation block ZRP and a pattern selection calculation block PTN. In the reference position calculation block ZRP, a position of the screw member NJB serving as a reference of the abutment state (contact start position at which the friction member MSB starts to be brought into contact with the rotation member KTB) is determined, and is stored. In the pattern selection calculation block PTN, "to which contact state the screw member NJB is retracted" is selected from a plurality of control patterns.

First, a description is given of the abutment states between the threads, and control patterns for respective retraction control patterns. As the abutment states between the threads, there are three states: a state in which the friction members MSB are in contact with the rotation member KTB, and a pressing member PSN is receiving a force from the friction member MSB (that is, a state in which the pressing force Fba is generated; hereinafter referred to as a "pressing abutment state"); a state in which the friction members MSB and the rotation member KTB just start to become away from each other, and the abutment parts of the threads are free (that is, the threads do not transmit power at all; hereinafter referred to as a "free abutment state;" and a state in which portions different from the portions which are in the abutting state under the pressing abutment state are in the abutting state, and the pressing member PSN is becoming away from the rotation member KTB (hereinafter referred to as a "retraction abutment state").

Thus, there are three control patterns: "abutment release pattern" in which at least the free abutment state is attained; "abutment switching pattern" in which at least the retraction abutment state is attained; and "limit retraction pattern" in which the screw is retracted up to a thread engagement limit of the threads. Now, a transition of the abutment state of the threads and an overview of the control patterns are briefly described for each control pattern.

Abutment Release Pattern:

In the abutment release pattern, the abutment state of the threads transitions from the pressing abutment state to the free abutment state.

In the abutment release pattern, the abutment (contact) between the first abutment parts of the threads screw is released, and the screw is retracted until the first abutment parts enter the free state. Then, the screw is moved to a standby position in a non-braking state.

Abutment Switching Pattern:

In the abutment switching pattern, the abutment state of the threads transitions in a sequence of (pressing abutment state→) free abutment state→retraction abutment state.

In the abutment switching pattern, after experiencing the free abutment state, the screw is retracted until the portions (second abutment parts) different from the portions which are in the abutting state under the pressing abutment state are in the abutting state. In the case of the trapezoidal screw, the screw is retracted until flanks (second flanks, which are clearance flanks during the pressing) on opposite sides of flanks (first flanks, which are pressure flanks during the pressing) that have abutted against each other in the pressing abutment state abut against each other. Then, the screw is moved to the standby position in the non-braking state.

Limit Retraction Pattern:

In the limit retraction pattern, the abutment state of the threads transitions in a sequence of (pressing abutment state→) free abutment state→retraction abutment state.

In the limit retraction pattern, after experiencing the state in which the abutment parts are switched, the screw is retracted to the limit portion of the possible thread engagement of the screw. For example, in the screw member NJB, the screw is retracted until the motion is restricted by a stopper. Then, the screw is moved to the standby position in the non-braking state.

The abutment state depends on the state in which the friction members MSB press the rotation member KTB. Thus, a position at which the friction members MSB and the rotation member KTB start to contact with each other is determined, and, based on this determined position, a reference position Zrp at which the abutment state is released may be estimated. The reference position Zpr is a position at which, when the pressing force Fba decreases, that is, when the electric motor MTR is rotated backward, the abutment state of the threads is switched from the pressing abutment state to the free abutment state.

As a method of determining the contact start position (the position at which MSB starts to contact with KTB), an estimation method based on the pressing force (for example, refer to JP 2004-124950 A), and an estimation method based on a rotational angle of an electric motor and a pressing force (for example, refer to JP 2001-225741 A) are publicly known. However, a determination method for the contact start position based on those publicly known methods includes an error. This error is caused by a detection error of a pressing force sensor, wear (including uneven wear) of the friction members MSB, a thermal deformation thereof, a backlash (a clearance) in a power transmission path of BRK, and the like. Therefore, a margin for reliably attaining the release of the abutment state (release of the contact between the first abutment parts) is estimated in advance to set the reference position Zrp. In other words, the reference position Zrp is determined by adding a predetermined value zgs corresponding to the error so as to cancel an error influence of the contact start position. However, if the predetermined value zgs is determined by accumulating all the above-mentioned errors, the predetermined value becomes excessive. Thus, the predetermined value zgs may be determined by selecting the maximum error out of those errors. Note that, the errors of the respective components are determined in advance when BRK is designed.

In the reference position calculation block ZRP, based on at least the pressing force Fba (detection value by the pressing force acquisition means FBA), the reference position Zrp (the position at which the pressing abutment state is just switched to the free abutment state when the pressing force Fba decreases) is determined, and is stored. Then, based on the stored reference position Zrp and specifications of the brake actuator BRK (such as specifications of the thread clearance, and the thread engagement position of the screw), target positions (target positions of the rotational angle of the electric motor) for which the respective control patterns may be carried out are determined. An abutment release position (target value) Pt1 is determined by adding a minute predetermined value pa to the reference position Zrp, which is the position at a moment when the contact between the first abutment parts is released. Moreover, an abutment switching position (target value) Pt2 is determined by adding a thread clearance length (which is known according to the specification) to the reference position Zrp. Further, a limit retraction position (target value) Pt3 is set. Note that, the limit retraction position Pt3 is a position determined based on the specifications of the thread engagement part of the screw, and does thus not need to be estimated based on the reference position Zrp.

In the pattern selection calculation block PTN, one of the three retraction control patterns is selected. The selection of the control pattern is made based on at least one of an acceleration operation amount Apa, a gear shift position Spa, and a vehicle speed Vxa. The acceleration operation amount Apa is an operation amount of an acceleration operation member (accelerator pedal) AP (not shown), and is acquired (detected) by acceleration operation amount acquisition means APA. For example, a stroke (displacement) of the acceleration operation member is detected by the acceleration operation amount acquisition means (stroke sensor) APA as the acceleration operation amount Apa. The gear shift position Spa is a position (for example, a parking position, a forward position, or a reverse position) of a gear shift member (shift lever) SP (not shown), and each shift position is acquired (detected) by gear shift position acquisition means SPA. The vehicle speed Vxa is acquired (detected) by vehicle speed acquisition means VXA. Wheel speed acquisition means VWA is provided to each wheel WHL, and the vehicle speed Vxa may be calculated based on a wheel speed (rotational speed) Vwa acquired by VWA.

Each control pattern is not selected when the braking operation amount Bpa increases or the braking operation amount Bpa is equal to or greater than a predetermined operation amount bpa0. Thus, one of the control patterns is selected when the braking operation amount Bpa decreases so that Bpa becomes smaller than the predetermined operation amount bpa0. The control pattern is selected based on at least one of the vehicle speed Vxa, the acceleration operation amount Apa, or the shift position Spa.

When the acceleration operation amount Apa is equal to or more than a first predetermined operation amount (predetermined value set in advance) ap1 (Apa≥ap1), the limit retraction pattern may be selected. When the acceleration operation amount Apa is less than the first operation amount ap1 and equal to or more than a second predetermined operation amount (predetermined value set in advance, which is less than ap1) ap2 (ap2≤Apa<ap1), the abutment switching pattern may be selected. When the acceleration operation amount Apa is less than the second predetermined operation amount ap2 (Apa<ap2), the abutment release pattern may be selected. When the acceleration operation amount Apa is large (that is, when the vehicle is quickly accelerated), a probability of quick braking is low, and the limit retraction pattern may be selected. On the other hand, when the acceleration operation amount Apa is small (that is, the vehicle is not quickly accelerated), the abutment release pattern may be selected in preparation for quick braking by the driver.

When the gear shift position (operation position of the selector) Spa of the transmission indicates the parking position (P range), the limit retraction pattern may be selected. This is because when the shift position Spa indicates the P range, the vehicle is reliably stopped.

When the vehicle speed Vxa is equal to or higher than a first predetermined speed (predetermined value set in advance) vx1 (Vxa≥vx1), the abutment release pattern may be selected. When the vehicle speed Vxa is lower than the first predetermined speed vx1 and equal to or higher than a second predetermined speed (predetermined value set in advance, which is smaller than vx1) vx2 (vx2≤Vxa<vx1), the abutment switching pattern may be selected. When the vehicle speed Vxa is lower than the second predetermined speed vx2 (Vxa<vx2), the limit retraction pattern may be selected. As the retraction amount increases, an effect of the lubrication renewal increases. On the other hand, as the retraction amount decreases, a responsiveness of the braking torque increases. Therefore, when the vehicle speed Vxa is low, the control pattern with a large retraction amount is selected. When the vehicle speed Vxa is high, the control pattern with a small retraction amount is selected. As a result, both of the lubrication property of the screw member NJB and the responsiveness of the braking torque may be achieved.

When each retraction control pattern is selected, the target position for the retraction is determined. In other words, the target position for the retraction control is determined as one of Pt1 (target position for the abutment release pattern), Pt2 (target position for the abutment switching pattern), and Pt3 (target position for the limit retraction pattern). Then, based on the target position for the retraction control and an actual position (rotational angle) Mka of the electric motor, the retraction current supply amount Iht (predetermined current supply amount iht1 set in advance) is output until Mka reaches the target position. When the electric motor rotational angle Mka becomes equal to the target position (Pt1, Pt2, or Pt3), the retraction current supply amount Iht is set to zero, and then, the position Mka of the electric motor is returned to the standby position (for example, the reference position Zrp). Note that, in the limit retraction pattern, the electric motor MTR only needs to be rotated backward until the operation of the screw is restricted by the stopper (member for restricting the rotation of the screw member NJB at a thread engagement end part), and the position (rotational angle) Mka of the electric motor is thus not always necessary.

As described above, the lubricant (for example, grease) GRS stored in the clearances of the threads (such as the flank clearances and the clearances between the balls and the ball grooves) is moved by adjusting the abutment state of the threads. The lubrication state of the screw member NJB may be appropriately maintained by the renewal of the application state of the lubricant GRS.

In the current supply amount adjustment calculation block IMT, a target current supply amount Imt, which is a final target value for the electric motor MTR, is calculated. When the retraction current supply amount (target value for the retraction control) Iht is not calculated, the target current supply amount Imt is calculated by adjusting the instructed current supply amount Ist based on the pressing force feedback current supply amount Ipt. Specifically, in the current supply amount adjustment calculation block IMT, when Iht=0, the feedback current supply amount Ipt is added to the instructed current supply amount Ist, and the sum is calculated as the final target current supply amount Imt. Moreover, when the retraction current supply amount Iht is calculated (Iht≠0), Iht is calculated as the target current supply amount Imt. Then, a rotational direction (a forward rotational direction for increasing the pressing force or a backward rotational direction for decreasing the pressing force) of the electric motor MTR is determined based on the sign (plus or minus of the value) of the target current supply amount Imt, and the output (rotational power) of the electric motor MTR is controlled based on a magnitude of the target current supply amount Imt.

[Braking Means (Brake Actuator) BRK]

The braking means BRK includes a brake caliper (floating caliper) CPR, the rotational member (for example, a brake disk) KTB, the friction members (for example, brake pads) MSB, the electric motor (brush motor or brushless motor) MTR, drive means (drive circuit for electric motor MTR) DRV, a speed reducer GSK, an input member INP, a shaft member SFT, the screw member NJB, the pressing member (brake piston) PSN, a key member KYA, position detection means MKA, current supply amount acquisition means IMA, and the pressing force acquisition means FBA.

An output (rotational power) of the electric motor MTR is transmitted to the input member INP via the speed reducer GSK. The rotational power of the input member INP is transmitted to the shaft member SFT via a universal joint (not shown). The rotational power (torque) of the shaft member SFT is converted into translational power (thrust) by the screw member NJB, which is the rotation/translation conversion mechanism, and is transmitted to the pressing member PSN. Then, the pressing member (brake piston) PSN is moved forward/backward with respect to the rotation member (brake disk) KTB. As a result, the force (pressing force) Fba applied by the friction members (brake pads) MSB to press the rotation member KTB is adjusted. The rotation member KTB is fixed to the wheel WHL, and hence a friction force is generated between the friction members MSB and the rotation member KTB, and the braking force on the wheel WHL is adjusted.

The brake caliper CPR is a floating caliper, and is configured to clamp/sandwich the rotation member (brake disk) KTB via the two friction members (brake pads) MSB. In the caliper CPR, the pressing member PSN is slid and moved forward/backward with respect to the rotation member KTB. A keyway KYM is formed in the caliper CPR in such a manner that it extends in the rotation axis (shaft axis) direction of the shaft member SFT.

The pressing member (brake piston) PSN presses the friction members MSB against the rotation member KTB, thereby generating the friction force. The key member KYA is fixed to the pressing member PSN. When the key member KYA is fitted into the keyway KYM, the pressing member PSN is restricted in the rotational motion about the shaft axis, but the translational motion in a direction of the shaft axis (lengthwise direction of the keyway KYM) is permitted.

A brushed motor or a brushless motor is employed as the electric motor MTR. Regarding the rotational direction of the electric motor MTR, a forward rotational direction corresponds to a direction in which the friction members MSB approach the rotation member KTB (direction in which the pressing force increases and the braking torque increases), and a backward rotational direction corresponds to a direction in which the friction members MSB become away from the rotation member KTB (direction in which the pressing force decreases and the braking torque decreases). The output of the electric motor MTR is determined based on the target current supply amount Imt calculated by the control means CTL. Specifically, when the sign of the target current supply amount Imt is plus (Imt>0), the electric motor MTR is driven in the forward rotational direction, and when the sign of Imt is minus (Imt<0), the electric motor MTR is driven in the backward rotational direction. Moreover, the rotational power of the electric motor MTR is determined based on the magnitude (absolute value) of the target current supply amount Imt. In other words, as the absolute value of the target current supply amount Imt increases, the output torque of the electric motor MTR increases, and as the absolute value of the target current supply amount Imt decreases, the output torque of the electric motor MTR decreases.

The position acquisition means (for example, an angle sensor) MKA detects a position (for example, a rotational angle) Mka of a rotor of the electric motor MTR. The position acquisition means MKA is provided inside the electric motor MTR.

In the drive means (electric circuit for driving the electric motor MTR) DRV, the current supply amount (finally, the current value) to the electric motor MTR is controlled based on the target current supply amount (target value) Imt. Specifically, the drive means DRV includes a bridge circuit in which a plurality of switching elements (power transistors such as MOS-FETs or IGBTs) are used. Those elements are driven based on the target current supply amount Imt of the electric motor, thereby controlling the output of the electric motor MTR. Specifically, the rotational direction and the output torque of the electric motor MTR are adjusted by switching the current supply/non-current supply state of the switching elements.

The current supply amount acquisition means (for example, a current sensor) IMA acquires (detects) an actual current supply amount (for example, a current actually flowing through the electric motor MTR) Ima supplied to the electric motor MTR. The current supply amount acquisition means IMA is provided inside the drive circuit DRV for the electric motor.

The speed reducer GSK reduces the rotational speed of the power of the electric motor MTR, and outputs the reduced rotational speed to the input member INP. In other words, the rotational output (torque) of the electric motor MTR is increased based on a speed reduction ratio of the speed reducer GSK, to thereby acquire the rotational force (torque) of the input member INP. For example, the speed reducer GSK includes a smaller diameter gear SKH and a larger diameter gear DKH. As the speed reducer GSK, a wrapping transmission mechanism such as a belt or a chain or a friction transmission mechanism may be used in place of the gear transmission mechanism.

The input member INP is fixed to an output shaft (for example, a rotation shaft of DKH) of the speed reducer GSK. The input member INP transmits the rotational power to the shaft member SFT. A universal joint UNV is provided between the input member INP and the shaft member SFT. The universal joint UNV absorbs a relative angle between two axes, and transmits power. A swing of the shaft member SFT may be generated by a warp of the floating caliper CPR, uneven wear of the friction members MSB, and the like, and eccentricity (axial misalignment) may be generated between the two axes (axis Jsf of SFT and axis Jin of INP), but the universal joint UNV absorbs the axial misalignment.

The shaft member SFT is a rotation shaft member, and transmits the rotational power transmitted from the input member INP to the screw member NJB. The universal joint mechanism UNV is constructed on one end part of the shaft member SFT, and the screw member (rotation/translation conversion mechanism) NJB is provided on the other end part.

The screw member NJB converts the rotational power of the shaft member SFT into the translational power. The screw member NJB is a so-called rotation/translation conversion mechanism. The screw member NJB includes a nut member NUT and a bolt member BLT. When the screw member NJB is a trapezoidal screw (power is transmitted by means of "slide"), a female thread (internal thread) MNJ is formed on the nut member NUT, and a male thread (external thread) ONJ is formed on the bolt member BLT. Then, the female thread MNJ of the nut member NUT and the male thread ONJ of the bolt member BLT are threadedly engaged with each other. The rotational power (torque) transmitted from the shaft member SFT is transmitted via the screw member NJB (the male thread ONJ and the female thread MNJ threadedly engaged with each other) as the translational power (thrust) of the pressing member PSN. Moreover, in place of the slide screw, a rolling screw (such as the ball screw) in which power is transmitted by means of "rolling" may be employed as the screw member NJB. In this case, thread grooves (ball grooves) are formed in the nut member NUT and the bolt member BLT, and balls (steel balls) are fitted therein, thereby being operated as the rotation/translation conversion mechanism.

The pressing force acquisition means FBA acquires (detects) a reaction force (reaction) of the force (pressing force) Fba generated by the pressing member PSN pressing the friction member MSB. The pressing force acquisition means FBA is provided between the input member INP and the caliper CPR. Specifically, the pressing force acquisition means FBA is fixed to the caliper CRP, and the force received by the pressing member PSN from the friction member MSB is acquired as the pressing force Fba. The pressing force Fba is detected as an analog signal, and is converted into a digital signal via the analog/digital conversion means ADH provided in the electronic control unit ECU, and the digital signal is input to the electronic control unit ECU.

First Embodiment of Braking Means BRK

Figure 2:
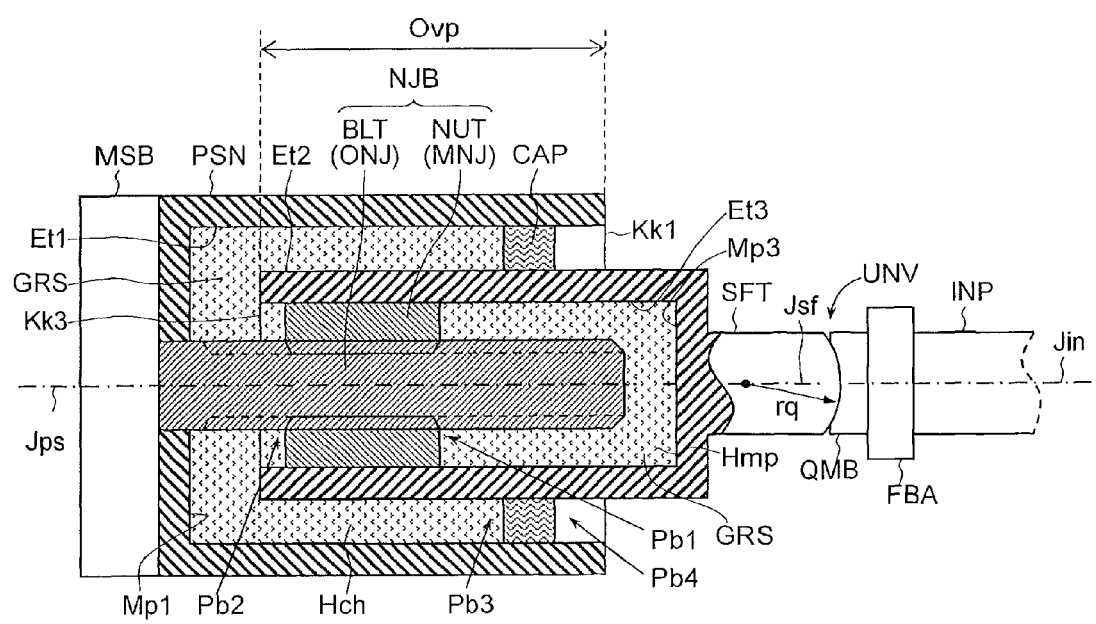
FIG. 2 is a diagram for illustrating a configuration of braking means illustrated in FIG. 1 according to a first embodiment of the present invention.

Next, referring to FIG. 2, a description is given of a first embodiment of the braking means (brake actuator) BRK. FIG. 2 corresponds to FIG. 1. In FIG. 2, the electric motor MTR, the speed reducer GSK, the pressing member (brake piston) CPR, and the like are the same as those of FIG. 1, and a description thereof is therefore omitted.

The input member INP is fixed to an output shaft (for example, a rotation shaft of the larger diameter gear DKH) of the speed reducer GSK. The input member INP is brought into contact with the shaft member SFT via the universal joint UNV. Specifically, a spherical surface (for example, a concave spherical surface) is formed on an end part (on an opposite side of a portion fixed to GSK) of the input member INP, and the end part may function as a part of the universal joint UNV.

The pressing force acquisition means FBA is fixed to the caliper CPR, and acquires (detects) a reaction force (reaction) of the force (pressing force) Fba generated by the pressing member PSN pressing the friction member MSB. The pressing force acquisition means FBA is provided on the input member INP, and outputs Fba (analog signal).

The universal joint UNV is provided between the input member INP and the shaft member SFT. Specifically, a spherical member (including a concave spherical surface having a radius rq) QMB is formed between the input member INP and the shaft member SFT, and an end surface of the shaft member SFT is formed into a spherical shape (convex spherical surface having the radius rq). The shaft member SFT and the spherical member QMB slide on each other, to thereby function as the universal joint UNV. The universal joint UNV absorbs the eccentricity (axial misalignment) between the axis Jin of the input member INP and the axis Jsf of the shaft member SFT, to thereby transmit power. Note that, the axial misalignment is caused by the warp of the floating caliper CPR and the uneven wear of the friction members MSB.

The pressing member PSN slides in the caliper CPR in the axial direction (Jsp direction, that is, the axial direction Jsf of SFT) of PSN to press the friction member MSB against the rotational member KTB. The rotational motion of the pressing member PSN with respect to the caliper CPR is restricted by the key member KYA and the keyway KYM, and the pressing member PSN is thus moved in the shaft axial direction (lengthwise direction of the keyway KYM). The eccentricity between Jin and Jsf is absorbed by the universal joint UNV, and the axis (shaft axis) Jsf of the shaft member SFT and the axis (pressing axis) Jps of the pressing member PSN are coaxial with each other.

The pressing member PSN has a cup shape. Specifically, the pressing member PSN is cylindrical, and has a shape that is closed on one end and open on the other end in the axial direction (Jps direction). A first cylindrical part (inner wall) Et1 is formed on an inner side (inner peripheral side) of the pressing member PSN. A surface of the first cylindrical part Et1 is formed by straight lines (that is, the surface is formed by a set of straight lines, and has a generatrix), and is smooth. When a curved surface is drawn by a movement of a straight line, the straight line at each position is a generatrix of the curved surface.

A sealing wall (partition wall) Mp1 is formed on one end part of the pressing member PSN, and the first cylindrical part Et1 is closed (blocked). The other end part (on an opposite side of the sealing wall Mp1) of the pressing member PSN is an open part (one portion of PSN) Kk1, and the first cylindrical part Et1 is in the open state.

The bolt member BLT including the male thread ONJ is fixed to the pressing member PSN (specifically, the sealing wall Mp1). A storage chamber Hch partitioned by the first cylindrical part (inner wall of PSN) Et1 the sealing wall (partition wall of PSN) Mp1, a cap member (lid) CAP, and a second cylindrical part (outer wall of SFT) Et2 is formed. The lubricant GRS is filled inside the storage chamber Hch without mixture of gas. Locations at which entrance/exit of the lubricant GRS to/from the storage chamber Hch occurs are limited to the screw member NJB (particularly, clearance between threads) and the cap member CAP (particularly, clearance between Et1 and Et2).

The screw member NJB converts the rotational power of the shaft member SFT into the translational power of the pressing member PSN (that is, the screw member NJB is a rotation/translation conversion mechanism). The screw member NJB includes the bolt member BLT and the nut member NUT. The bolt member BLT is fixed to the sealing wall Mp1 of the pressing member PSN. The male thread (external thread) ONJ is formed on the bolt member BLT. The nut member NUT is fixed to the shaft member SFT. The female thread (internal thread) MNJ is formed on the nut member NUT, and the female thread MNJ and the male thread ONJ are threadedly engaged with each other. The lubricant GRS is applied to the screw member NJB. Specifically, gas is removed from the clearance between the male thread ONJ and the female thread MNJ as much as possible, and the lubricant GRS is filled therein.

The shaft member SFT transmits the rotational power of the input member INP to the screw member NJB. The spherical surface (for example, a convex spherical surface) is formed at the end part of the shaft member SFT to be brought into contact with the input member INP, and abuts against the spherical member QMB in a sliding manner, to thereby function as a part of the universal joint UNV.

The shaft member SFT has a cup shape smaller in diameter than the first cylindrical part Et1 on an opposite side of the portion abutting against the input member INP. In the cup shape of the shaft member SET, the second cylindrical part Et2 is formed on the outer side, and a third cylindrical part Et3 is formed on the inner side. A surface of the second cylindrical part Et2 is formed by straight lines (that is, has a generatrix), and is smooth. On one end part of the third cylindrical part Et3, a sealing wall Mp3 is formed so as to close Et3. The other end part (on an opposite side of the sealing wall Mp3) of the third cylindrical part Et3 is an open part (one portion of SFT) Kk3, and Et3 is in the open state.

The shaft member SFT is inserted inside the first cylindrical part Et1 (for example, the PSN inner peripheral part having the cylindrical shape) of the pressing member PSN. Therefore, the first cylindrical part Et1 of the pressing member PSN and the second cylindrical part Et2 (for example, the SFT outer peripheral part having the cylindrical shape) of the shaft member SFT have an overlapping part Ovp. The nut member NUT including the female thread MNJ is fixed to the third cylindrical part Et3. A sealed chamber Hmp (closed space separated from the outside) partitioned by the third cylindrical part Et3 (for example, the SFT inner peripheral part having the cylindrical shape), the sealing wall (partition wall of SFT) Mp3, and the nut member NUT is formed. The lubricant GRS is filled inside the sealed chamber Hmp without mixture of gas (gas is removed as much as possible). A location at which entrance/exit of the lubricant to/from the sealed chamber occurs is limited to the screw member NJB (particularly, the clearance between threads).

The cap member CAP is a lid (cap) for preventing the lubricant GRS from flowing out from the storage chamber Hch (for example, a position Pb3) to an outside position Pb4, and preventing the gas (air) from flowing into the storage chamber Hch (for example, the position Pb3) from the outside position Pb4. Specifically, the cap member CAP has a disc shape having a hole at the center, and is brought into slide contact with the first cylindrical part Et1 on the outer peripheral part thereof and brought into slide contact with the second cylindrical part Et2 on the inner peripheral part thereof. The cap member CAP can move relatively in the axial direction with respect to the pressing member PSN and the shaft member SFT (the translational motion in the direction parallel to the axis, and the motion in the Jps direction and the Jsf direction). Moreover, the cap member CAP can move relatively about the axis with respect to at least one of the pressing member PSN or the shaft member SFT (the rotational motion about the axis, and the relative rotational motion about at least one axis of Jps or Jsf). The axis Jps of the pressing member PSN and the axis Jsf of the shaft member SFT are the same.

A decrease in an efficiency of the screw member NJB is mainly due to exhaustion (grease exhaustion) of the lubricant GRS. Specifically, the exhaustion of the lubricant GRS may be generated by entrance of the gas (air) into an interface lubricated by the lubricant GRS. Therefore, the lubrication state of the screw member NJB may be satisfactorily maintained by filling the screw member NJB and a periphery thereof with the lubricant GRS and by separating (isolating) those regions from the regions (gas parts) in which the gas (for example, air) exists.

The sealed chamber Hmp is formed at one end part (position Pb1) of the screw member NJB, and the lubricant GRS is fully filled in the inside thereof. In other words, the chamber (sealed chamber) Hmp partitioned by the walls and having the dead end is formed at one end of the screw member NJB, and the inside thereof is filled with the lubricant GRS in a state in which the air inside is removed as much as possible. Therefore, the air will not flow in from the position Pb1 on the one end of the screw member NJB. The storage chamber Hch is formed at the other end part (position Pb2) of the screw member NJB, and the lubricant GRS is also fully filled in the inside thereof. In other words, also in Hch, the gas is removed as much as possible, and GRS is filled. The path of the inflow of the gas into the storage chamber Hch is the path from the open part Kk1, but this path is covered (blocked) by the cap member CAP, and the inflow of the air from this region is suppressed. For example, in the seal disclosed in Patent Literature 3, the slide contact surface shape (sealing by the ball grooves) is not formed in a straight line shape, and hence the seal effect is not sufficient. In contrast, according to the first embodiment, the first cylindrical part Et1 and the second cylindrical part Et2 with which the cap member CAP is brought into slide contact are formed in such a manner that the slide contact surfaces (slide surfaces) thereof are formed by the straight lines (set of straight lines). Thus, the inflow of the gas and the outflow of the lubricant GRS may be effectively prevented.

Further, in the pressing member PSN and the shaft member SFT, the two cylindrical members having the smaller and larger cup shapes different in diameter are formed so as to be opposed to and overlap with each other at the respective opening parts Kk1 and Kk3. Thus, the storage chamber Hch (chamber in which the lubricant GRS is filled) is formed throughout at least the overlapping part Ovp (internal space of PSN). In other words, the lubricant GRS exists from the end part Pb2 of the screw member NJB to a portion close to the part Pb4 at which the gas exists. This overlapping structure can secure a path through which the gas can sufficiently pass from the screw member NJB (position Pb2) to the position Pb4, without extending the axial length of the overall BRK. The screw member NJB is separated from the gas part (position Pb4) by providing the sufficiently long section in which the lubricant GRS is filled, and, as a result, the gas inflow to the screw member NJB can be effectively suppressed.

As for the thread shapes of the male thread ONJ and the female thread MNJ, clearances between the threads (crest clearances and flank clearances) may serve as a flow passage of the lubricant GRS. The volume of the sealed chamber Hmp changes in accordance with the movement of the pressing member PSN (forward movement or backward movement with respect to the rotation member). Specifically, when the pressing member PSN moves forward to the rotation member KTB (when the pressing force Fba increases, and the braking torque thus increases), the volume of the sealed chamber Hmp increases by an amount corresponding to the forward movement of the bolt member BLT. On the other hand, when the pressing member PSN moves backward from the rotation member KTB (when the pressing force Fba decreases, and the braking torque thus decreases), the volume of the sealed chamber Hmp decreases by an amount corresponding to the backward movement of the bolt member BLT. The screw member NJB and the sealed chamber Hmp are fully filled with the lubricant GRS (that is, the gas is not mixed), and hence this volume change can be absorbed by the movement of the lubricant GRS through the clearances of the screw member NJB to the storage chamber Hch. Moreover, the lubricant GRS in the screw member NJB is renewed by this movement of the lubricant GRS, and thus, the lubrication state can be appropriately maintained.

The universal joint UNV may be provided between the pressing member PSN and the shaft member SFT. However, when this configuration is employed, a parallelism between the first cylindrical part Et1 (a part of the pressing member PSN, and is the inner peripheral part) and the second cylindrical part Et2 (a part of the shaft member SFT, and is the outer peripheral part) is not sufficient, and hence the cap member CAP inclines. Accordingly, the motion of the cap member CAP in the axial direction may be obstructed. In contrast, according to the first embodiment, the universal joint UNV is provided between the input member INP and the shaft member SFT so as to maintain the parallelism between the first cylindrical part Et1 and the second cylindrical part Et2, and hence the smooth slide of the cap member CAP can be secured.

<Case in which Trapezoidal Screw is Used as Screw Member NJB>

Figure 3:
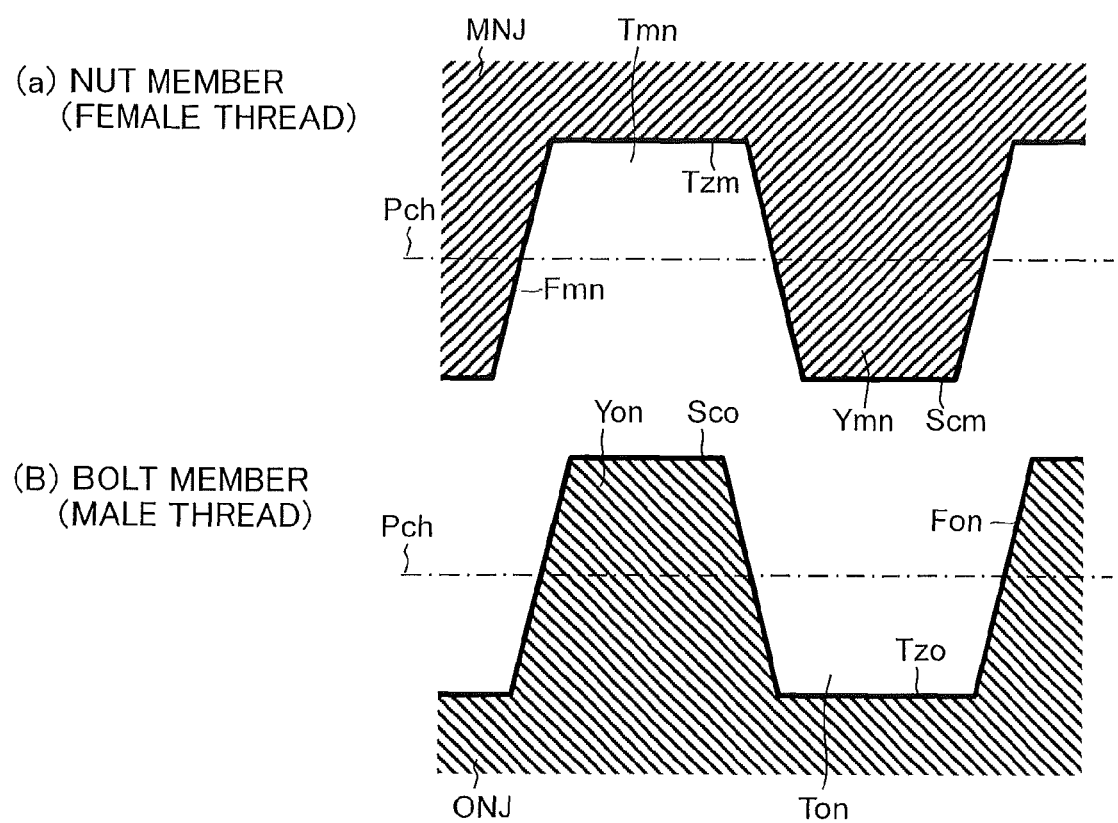
FIG. 3 are diagrams for illustrating a screw member illustrated in FIG. 2.
Figure 4:
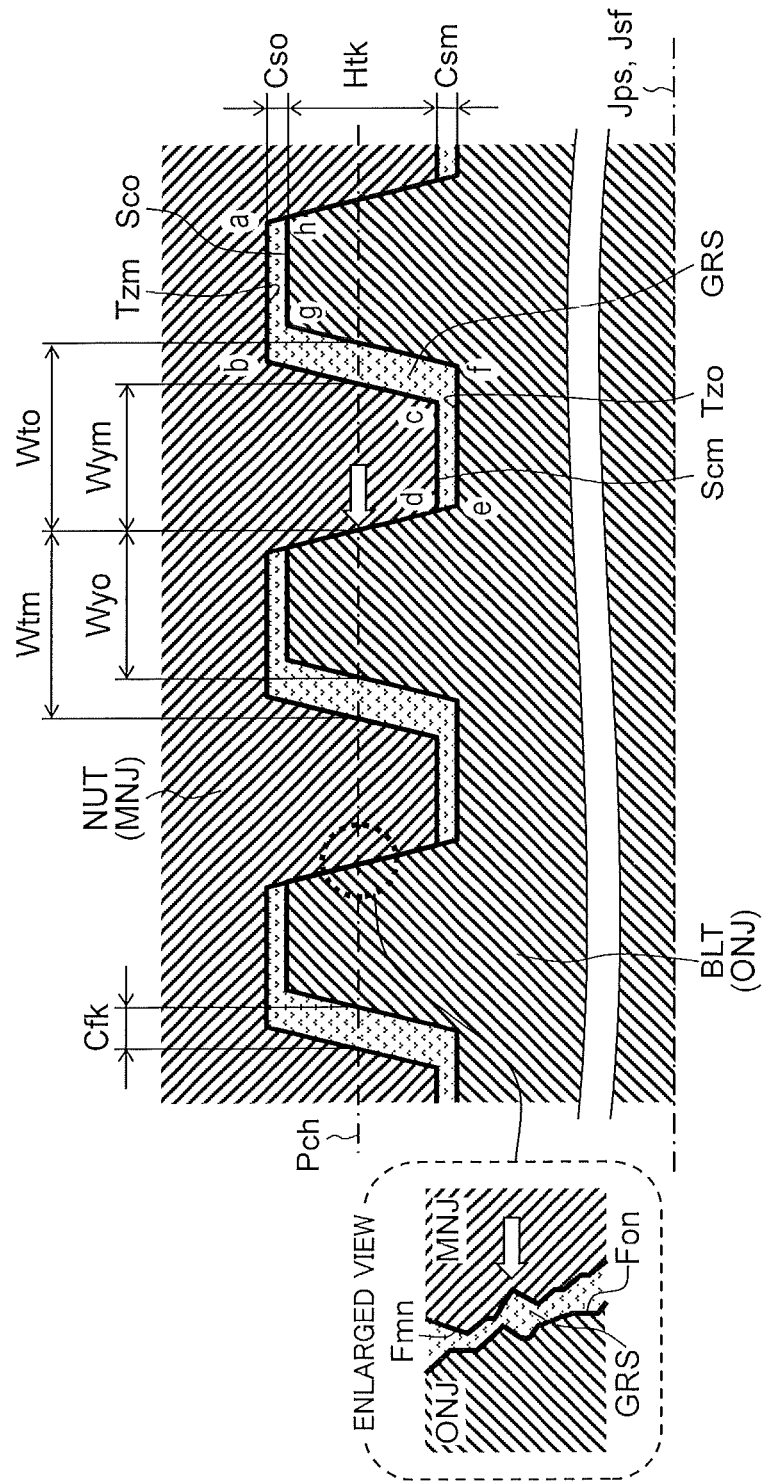
FIG. 4 is a diagram for illustrating a thread engagement state and thread clearances of the screw member illustrated in FIG. 2.

Next, referring to FIGS. 3 and 4, a description is given of the screw member NJB (particularly, thread shape). The screw member NJB is a trapezoidal screw, and includes the female thread MNJ and the male thread ONJ.

FIG. 3 is a diagrams for defining and illustrating names of respective portions in the screw member NJB. The shape of the female thread (internal thread) MNJ has a crest part Ymn of the female thread and a root part (groove part) Tmn of the female thread. Specifically, the shape of the female thread has a crest Scm of the female thread, a flank Fmn of the female thread, and a root Tzm of the female thread. Similarly, the shape of the male thread (external thread) ONJ has a crest part Yon of the male thread and a root part (groove part) Ton of the male thread. Specifically, the shape of the male thread has a crest Sco of the male thread, a flank Fon of the male thread, and a root Tzo of the male thread. The crests Scm and Sco are flat portions of the crest parts of the threads, and the roots Tzm and Tzo are flat portions of the root parts of the threads. The flank Fmn is a surface for connecting between the crest Scm and the root Tzm, and the flank Fon is a surface connecting between the crest Sco and the root Tzo. Fmn and Fon are straight lines in sections including the rotational axes of the threads. The force is transmitted by a pressure contact between the flank Fmn of the female thread MNJ and the frank Fon of the male thread ONJ.

FIG. 4 is a diagram for illustrating a state in which the female thread MNJ and the male thread ONJ are threadedly engaged with each other. FIG. 4 is an illustration of a state in which the crest part Ymn of the female thread and the root part Ton of the male thread mesh with each other, the root part Tmn of the female thread and the crest part Yon of the male thread mesh with each other, and the female thread MNJ presses against the male thread ONJ (in FIG. 4, the female thread MNJ presses against the male thread ONJ in a direction indicated by the arrow). On the female thread MNJ and the male thread ONJ, a flank on the side on which the force is acting (loading side) is referred to as a "pressure flank," and a flank on the side, which is opposite to the pressure flank and on which the force is not acting, is referred to as a "clearance flank."

In the clearance flanks, a clearance (distance on a pitch line) between the clearance flank of the female thread MNJ and the clearance flank of the male thread ONJ is referred to as a flank clearance Cfk. A pitch line Pch is a generatrix of a virtual cylinder used to define an effective diameter of the thread. In other words, the generatrix is a generatrix of a cylinder on which a width Wyo of the male crest part and a width Wym of the female crest part are equal to each other, and can also be considered as a generatrix of a cylinder on which a width Wto of the male root part (width of the male groove) and a width Wtm of the female root part (width of the female groove) are equal to each other.

Thread clearances serve as a movement path of the lubricant GRS between the sealed chamber Hmp and the storage chamber Hch. The thread clearances are represented as a portion, a-b-c-d-e-f-g-h, in the cross sectional shape of the threads, and is formed by the crest clearance Csm of the female thread MNJ, the crest clearance Cso of the male thread ONJ, and the flank clearance Cfk. The crest clearance (also the root clearance of the male thread) Csm of the female thread MNJ is a clearance between the crest Scm of the female thread and the root Tzo of the male thread. Specifically, in the cross sectional shapes of the female thread MNJ and the male thread ONJ coaxially fit to each other (on a cross section including the rotational axes Jps and Jsf of the threads), the crest clearance Csm of the female thread is a clearance between a straight line connecting the crests (surface connecting the flanks located at both sides of the thread crest with each other) of the female thread and a straight line connecting the roots (surface connecting the flanks located at both sides of the thread root with each other) of the male thread. Similarly, the crest clearance (also the root clearance of the female thread) Cso of the male thread ONJ is a clearance between the crest Sco of the male thread and the root Tzm of the female thread. Specifically, in the cross sectional shapes of the female thread MNJ and the male thread ONJ coaxially fit to each other (on the cross section including the rotational axes Jps and Jsf of the threads), the crest clearance Cso of the female thread is a clearance between a straight line connecting the roots of the female thread and a straight line connecting the crests of the male thread. In addition, the frank clearance Cfk is a clearance between the frank Fmn of the female thread MNJ and the flank Fon of the male thread ONJ.

The motion (movement) of the pressing member PSN causes the volume change in the sealed chamber Hmp. In other words, when the pressing force Fba increases, the volume of the sealed chamber Hmp increases. When Fba decreases, the volume of Hmp decreases. The sealed chamber Hmp is filled with the lubricant GRS, and this volume change is absorbed by the movement of the lubricant GRS which moves through the thread clearance. In other words, when the volume of the sealed chamber Hmp decreases, the lubricant GRS in the sealed chamber Hmp is discharged to the screw member NJB. Conversely, when the volume of the sealed chamber Hmp increases, the lubricant GRS is sucked from the screw member NJB into the sealed chamber Hmp. As a result of this movement of the lubricant GRS, the lubricant GRS in the screw member NJB is renewed, and the lubrication state can be appropriately maintained.

If the thread clearances (crest clearances Csm and Cso and the flank clearance Cfk) are used as the flow passage of the lubricant GRS, a flow resistance (viscous resistance) of the lubricant GRS affects the efficiency of the braking means BRK. Thus, a cross sectional area of the thread clearances is set based on the viscosity of the lubricant GRS. In a state of no load (in the state in which the pressing force is zero), the cross sectional area of the thread clearances may be determined so that the rotational power (that is, a torque loss caused by the movement of the lubricant GRS) of the electric motor MTR required for the flow of the lubricant GRS is equal to or less than a predetermined value. The cross sectional area of the thread clearances is a total area of Csm, Cso, and Cfk on the cross section including the rotational axes (Jps and Jsf) of the threads, and, in the example illustrated in FIG. 4, is an area of a portion enclosed by (a) to (h).

The portions for converting the rotational power of the electric motor MTR into the pressing force are the flanks of the threads, and hence it is preferable that the lubricant GRS move into the flank clearance. In the thread shape of the screw member NJB, the widths Wtm and Wto of the thread grooves (thread roots) are set so as to be respectively larger (wider) than the widths Wym and Wyo of the thread crests on the pitch line Pch of the threads so that at least the flank clearance Cfk serves as the flow passage for the lubricant GRS. Through this clearance (flank clearance Cfk), the lubricant GRS is moved between the sealed chamber Hmp and the storage chamber Hch. For the thread engagement of the threads, a certain amount of a backlash is required, and the flank clearance Cfk may be set to a value larger than a standard backlash defined in the thread standard. Moreover, the flank clearance Cfk (distance between the segment be and the segment fg) is set so as to be larger (wider) than at least one of the crest clearance Csm (distance between the segment cd and the segment ef) of the female thread MNJ and the crest clearance Cso (distance between the segment ab and the segment gh) of the male thread ONJ.

<Description of Abutment State (Particularly, Abutment State of Trapezoidal Screw) of Threads>

Figure 5:
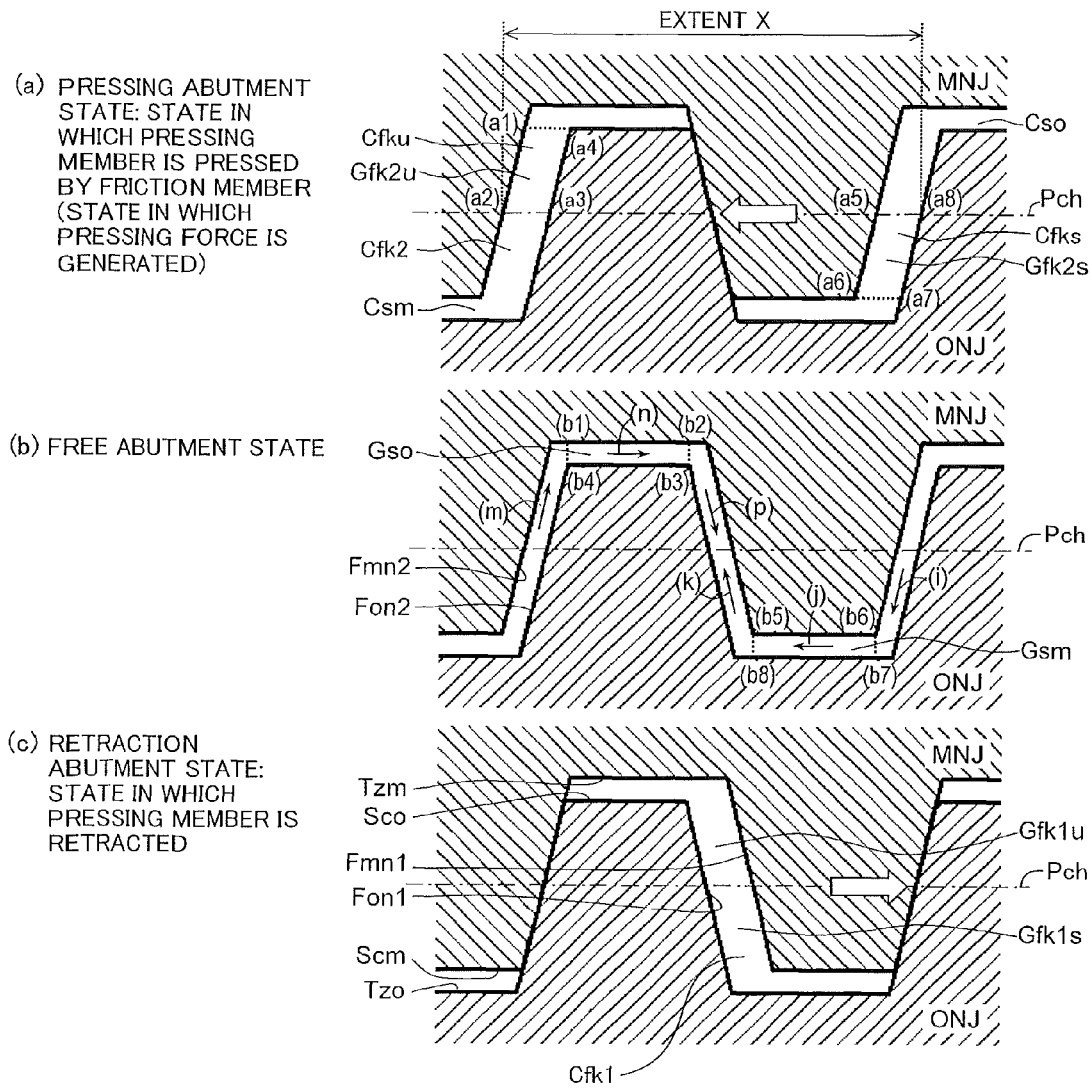
FIG. 5 are diagrams for illustrating a transition of an abutment state between flanks of the screw member illustrated in FIG. 2.

Next, referring to FIG. 5, a description is firstly given of the abutment state (abutment state of the flanks) of the threads and the movement of the lubricant (grease) generated by the change in the abutment state in the retraction operation. As for the movement of the lubricant (grease) GRS, a description is given of a movement corresponding to one pitch of the threads represented by an extent X.

FIG. 5 correspond to FIG. 2. In other words, the nut member NUT (having the female thread MNJ) is fixed to the shaft member SFT, and the bolt member BLT (having the male thread ONJ) is fixed to the pressing member PSN. On the screw member NJB, the crest clearances Csm and Cso and the flank clearance Cfk (first flank clearance Cfk1 and second flank clearance Cfk2) are formed so as to enable the lubricant (grease) GRS to move. The abutment state between the threads is a contact state between the flanks generated by a mutual positional relationship between the female thread MNJ and the male thread ONJ.

FIG. 5($a$) is an illustration of a state in which the pressing member PSN presses the friction member MSB (that is, PSN receives the pressing force (reaction) Fba from MSB), and the male thread ONJ is pressed by the female thread MNJ in the direction represented by the arrow. This abutment state is the "pressing abutment state" described above. In the pressing abutment state, the first flank Fmn1 of the female thread and the first flank Fon1 of the male thread abut against each other (that is, Fmn1 and Fon1 are the pressure flanks). On this occasion, the first flanks Fmn1 and Fon1 are referred to as "pressure flanks during pressing (corresponding to the first abutment parts)." On the other hand, the second flank Fmn2 of the female thread and the second flank Fon2 of the male thread are in the non-contact state, and a clearance Cfk2 exists therebetween (that is, Fmn2 and Fon2 are the clearance flanks). On this occasion, the second flanks Fmn2 and Fon2 are referred to as "clearance flanks during pressing (corresponding to the second abutment parts)." The lubricant GRS is filled in the crest clearances Csm and Cso and the flank clearance Cfk2.

FIG. 5($b$) is an illustration of a free state, in which the electric motor MTR is rotated backward, the first flanks Fmn1 and Fon1, which are the pressure flanks, start departing from each other, and the pressing force Fba does not act on the pressing member PSN. This abutment state is the "free abutment state" described above. None of the flanks are in contact with each other in the free abutment state. When the abutment state of the threads transitions from the pressing state to the free state, the clearance (second flank clearance) Cfk2 between the second flank Fmn2 of the female thread and the second flank Fon2 of the male thread, which are the clearance flanks in the pressing state, is reduced. As a result, the lubricant GRS existing in the crest clearance Cso of the male thread is pressed out to the other flank clearance (first flank clearance Cfk1, which is the clearance between Fmn1 and Fon1). Specifically, as represented by arrows (m), (n), and (p), grease Gso in the crest clearance of the male thread is pushed out by grease Gfk2u above the pitch line Pch, and Gso flows into the first flank clearance (clearance between Fmn1 and Fon1) Cfk1. Similarly, as represented by arrows (i), (j), and (k), grease Gsm in the crest clearance of the female thread is pushed out by grease Gfk2s below the pitch line Pch, and Gsm is moved into the first flank clearance Cfk1.

FIG. 5(c) is an illustration of a state in which the second flank Fmn2 (flank on the opposite side of the first flank Fmn1 in the female thread MNJ) of the female thread and the second flank Fon2 (flank on the opposite side of the first flank Fon1 in the male thread ONJ) of the male thread are in contact with each other, and are the pressure flanks, and the pressing member PSN (male thread ONJ) is retracted in the direction of the arrow. This abutment state is the "retraction abutment state" described above. In the abutment state of the threads, the transition from "the pressing abutment state (refer to FIG. 5(a)" to "the retraction abutment state (refer to FIG. 5(c))" is referred to as an "abutment switching." In other words, the abutment switching is switching from the state in which the flanks on the one side (first flanks Fmn1 and Fon1) are in contact with each other to the state in which the flanks on the other side (second flanks Fmn2 and Fon2) are in contact with each other. In the retraction abutment state, the second flanks Fmn2 and Fon2 abut against each other, and hence the grease GRS in an amount corresponding to grease Gfk2 (=Gfk2u+Gfk2s) existing in the second flank clearance Cfk2 is moved from the crest clearance Csm (clearance between Scm and Tzo) and Cso (clearance between Sco and Tzm) to the first flank clearance (clearance between Fmn1 and Fon1) Cfk1.

The first flanks Fmn1 and Fon1 are the pressure flanks when the pressing force Fba is increased, and hence when the braking torque is increased, new lubricant GRS is supplied to the flanks Fmn1 and Fon1 for transmitting the power (that is, the lubricant GRS is renewed). As a result, the lubrication state of the screw member NJB can be appropriately maintained, and the efficiency of BRK can be secured. Note that, the supply of the lubricant GRS to the first flanks Fmn1 and Fon1 is started at a time point when the state enters the free abutment state, and is completed at a time point when the state enters the retraction abutment state. Therefore, the lubricant (grease) for the first flanks Fmn1 and Fon1 may be renewed when at least such a condition that the abutment state becomes the free abutment state (first flanks Fmn1 and Fon1 becomes separated from each other) is satisfied.

As a result of the transition of the abutment state of the flanks, the lubricant GRS stored in the crest clearances Cms and Cos flows into the flank clearances Cfk (Cfk1 and Cfk2), and the lubricant in Cfk is renewed. This movement of the lubricant GRS can maintain/improve the lubrication state of the screw member NJB. In the one pitch of the threads, a thread shape of the screw member NJB may be set/determined so as to satisfy at least one of such a condition that a cross sectional area (cross sectional area a5-a6-a7-a8) formed by a flank clearance (flank clearance from the pitch line Pch to the female thread crest Scm) Cfks is larger than a cross sectional area (cross sectional area b5-b6-b7-b8) formed by the crest clearance Csm of the female thread MNJ and such a condition that a cross sectional area (cross sectional area a1-a2-a3-a4) formed by a flank clearance (flank clearance from the pitch line Pch to the male thread crest Sco) Cfku is larger than a cross sectional area (cross sectional area b1-b2-b3-b4) formed by the crest clearance Cso of the male thread ONJ. In other words, the shapes of the threads are determined so as to satisfy at least one of "(cross sectional area a5-a6-a7-a8)>(cross sectional area b5-b6-b7-b8)" and "(cross sectional area a1-a2-a3-a4)> (cross sectional area b1-b2-b3-b4)." Therefore, the amount of the lubricant Gfk2s and Gfk2u accommodated in the flank clearances is more than at least one of the amounts of the lubricant Gsm and Gso accommodated in the crest clearances of the female thread and the male thread. As a result of the decrease in the clearances of the flanks (second flanks Fmn2 and Fon2, which are the clearance flanks when the pressing force increases) on the one side, the grease accumulated in the crest clearances is reliably pushed into the clearances of the other flanks (first flanks Fmn1 and Fon1, which are the pressure flanks when the pressing force increases). As a result, the lubrication state of the screw member NJB can be secured, and the efficiency of the brake actuator BRK can be maintained.

The shape of the trapezoidal screw for preferably moving the lubricant into the thread clearances is now summarized. In the one pitch of the threads, the shape is set so as to satisfy at least one of the condition that "the cross sectional area formed by the flank clearance Cfks on the female thread crest Scm side with respect to the pitch line Pch (cross sectional area a5-a6-a7-a8) is larger than the cross sectional area formed by the crest clearance Csm of the female thread" (cross sectional area b5-b6-b7-b8) and the condition that "the cross sectional area formed by the flank clearance Cfku on the male thread crest Sco side with respect to the pitch line Pch (cross sectional area a1-a2-a3-a4) is larger than the cross sectional area formed by the crest clearance Cso of the male thread" (cross sectional area b1-b2-b3-b4). Moreover, the thread shape may be defined by a width of the clearances in place of the definitions of the cross sectional areas. Specifically, the flank clearance Cfk (width of the clearance such as the distance between a segment a1-a2 and a segment a3-a4) may be set so as to be more (wider) than at least one of the crest clearance Csm (width of the clearance, which is the distance between a segment b5-b6 and a segment b7-b8) of the female thread and the crest clearance Cso (width of the clearance, which is the distance between a segment b1-b2 and a segment b3-b4) of the male thread.

<Embodiment of Cap Member CAP>

Figure 6:
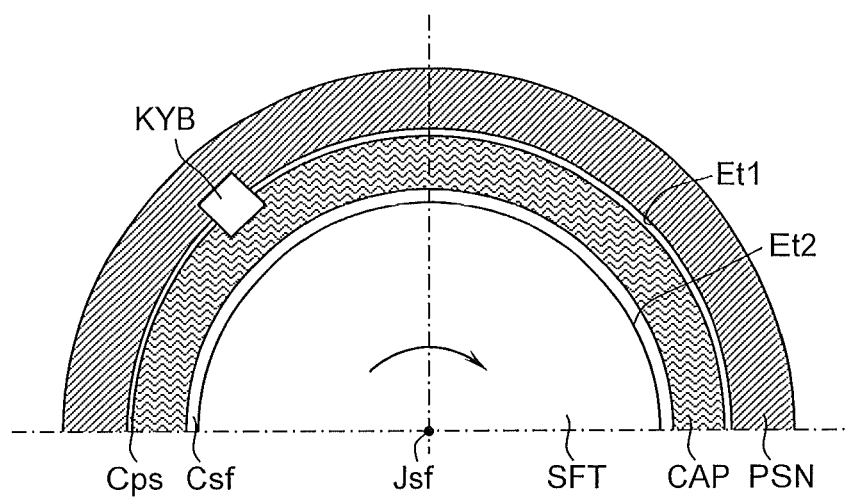
FIG. 6 is a diagram for illustrating a slide of a cap member illustrated in FIG. 2.

Next, referring to FIG. 6, a description is given of an embodiment of the cap member CAP.

The cap member CAP has the disc shape having the hole at the center, is in the slide contact with the first cylindrical part Et1 (cylindrical shape) of the pressing member PSN on the outer peripheral part thereof, and in the slide contact with the second cylindrical part Et2 (cylindrical shape) of the shaft member SFT on the inner peripheral part thereof. The cap member CAP can carry out the translational movement (movement in the direction of the axis Jps of PSN, and the movement in the direction of the axis Jsf of SFT) in the axial direction with respect to the pressing member PSN and the shaft member SFT, and the relative rotation (rotation about at least one axis of Jps and Jsf) about the axis of at least one of the pressing member PSN and the shaft member SFT. Note that the axis Jps of PSN and the axis Jsf of SFT are the same axis. The cap member CAP functions as the lid (cap) for preventing the lubricant GRS from flowing out from the storage chamber Hch (for example, the position Pb3) to the outside position Pb4, and for simultaneously preventing the gas (air) from flowing into the storage chamber Hch (for example, the position Pb3) from the outside position Pb4.

A clearance Csf between the second cylindrical part Et2 and the cap member CAP may be set larger than a clearance Cps between the first cylindrical part Et1 and the cap member CAP. The shaft member SFT is rotated, and hence the relative rotational slide between the cap member CAP and SFT may be carried out on the second cylindrical part Et2. The clearance Csf (clearance between CAP and SFT) is set to be relatively large, and hence the slide resistance of the rotation may be reduced. When the rotational slide on the second cylindrical part Et2 is permitted, the rotational slide on the first cylindrical part Et1 does not need to be carried out. Therefore, the clearance Cps (clearance between CAP and PSN) may be set to be relatively narrow. As a result, an inclination of the cap member CAP with respect to the pressing member PSN and the shaft member SFT can be suppressed. Further, a key member KYB and a keyway fitting to the key member KYB are provided between the pressing member PSN and the cap member CAP, and a relative rotational motion between the cap member CAP and the pressing member PSN (Et1) may be restricted. As a result, an effect of suppressing the inclination of the cap member CAP may be increased.

The volume change of the reservoir Hch is generated by the movement (forward movement or backward movement) of the pressing member PSN to and from the rotational member KTB. If the sealed chamber Hmp is provided on the end part (on the opposite side of Hch) of the screw member NJB, the volume change of the sealed chamber Hmp is also generated. Further, the volume of the sealed chamber Hmp changes, and the lubricant GRS thus flows into or flows out from the reservoir Hch via the screw member NJB. The cap member CAP can slide along with the first cylindrical part Et1 (inner peripheral part of the pressing member PSN) and the second cylindrical part Et2 (outer peripheral part of the shaft member SFT) in the axial direction, and the volume change and the movement of the lubricant GRS caused by the volume change of the sealed chamber Hmp are thus absorbed by the movement (slide) of the cap member CAP.

Note that, the volume change is generated in a sequence of a braking operation (operation from the generation to the release of the braking torque during the braking carried out once). This volume change is caused by rigidities of the caliper CPR and the friction member MSB. The volume change of the friction members MSB may also be generated by the secular wear of the friction members MSB. The volume change caused by the braking operation is relatively small, but the volume change caused by the secular wear is larger than that caused by the braking operation. The movement of the lubricant GRS caused by the volume change resulting from the wear of the friction members MSB may also be absorbed by the cap member CAP.

Second Embodiment of Braking Means BRK

Figure 7:
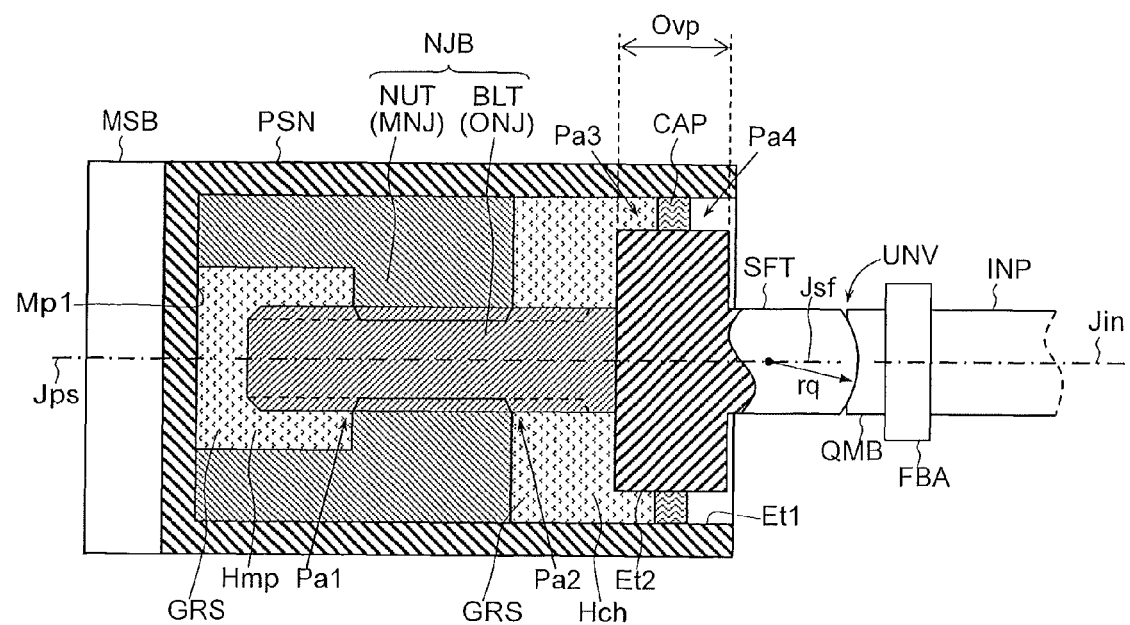
FIG. 7 is a diagram for illustrating a configuration of the braking means illustrated in FIG. 1 according to a second embodiment of the present invention.

Next, referring to FIG. 7, a description is given of a second embodiment of the braking means (brake actuator) BRK. FIG. 7 corresponds to FIG. 2. Therefore, in FIG. 7, members providing the same or equivalent functions as in the members of FIG. 2 are denoted by the same reference numerals as in FIG. 2. In the first embodiment (refer to FIG. 2), the bolt member BLT is fixed to the pressing member PSN, and the nut member NUT is fixed to the shaft member SFT, but in the second embodiment, the nut member NUT is fixed to the pressing member PSN, and the bolt member BLT is fixed to the shaft member SFT. The cap member CAP is internally in contact with the first cylindrical part Et1 of the pressing member PSN, and is externally in contact with the second cylindrical part Et2 of the shaft member SFT. The cap member CAP slides on the first cylindrical part Et1 in the direction of the axes (Jps and Jsf), and slides on the second cylindrical part Et2 in the direction of and about the axes. In order to maintain the slide property between the cap member CAP and the first cylindrical part Et1 and the second cylindrical part Et2, the universal joint UNV is provided between the input member INP and the shaft member SFT. The pressing member PSN (for example, the wall Mp1) and the end part of the screw member NJB form the sealed chamber Hmp. Moreover, the storage chamber Hch is formed by the pressing member PSN (for example, the inner peripheral part Et1), the screw member NJB, and the cap member CAP. In addition, the lubricant (grease) GRS is applied to the screw member NJB, and the lubricant GRS is also filled in the sealed chamber Hmp and the storage chamber Hch.

Also in the second embodiment, the same functions and effects as in the first embodiment are provided. In other words, the storage chamber Hch is formed by the cap member CAP, and hence the entrance of the gas into the screw member NJB (particularly the part of the position Pa2) may be suppressed. Moreover, the sealed chamber Hmp is formed on the end part (part of the position Pa1) of the screw member NJB, and hence the gas entrance from this part is prevented. Further, the volume change of the sealed chamber Hmp by the braking operation renews the lubricant (grease) GRS via the clearance of the screw member NJB. As a result, the lubrication state of the screw member NJB can be appropriately maintained.

<Case in which Ball Screw is Used as Screw Member NJB>

Figure 8:
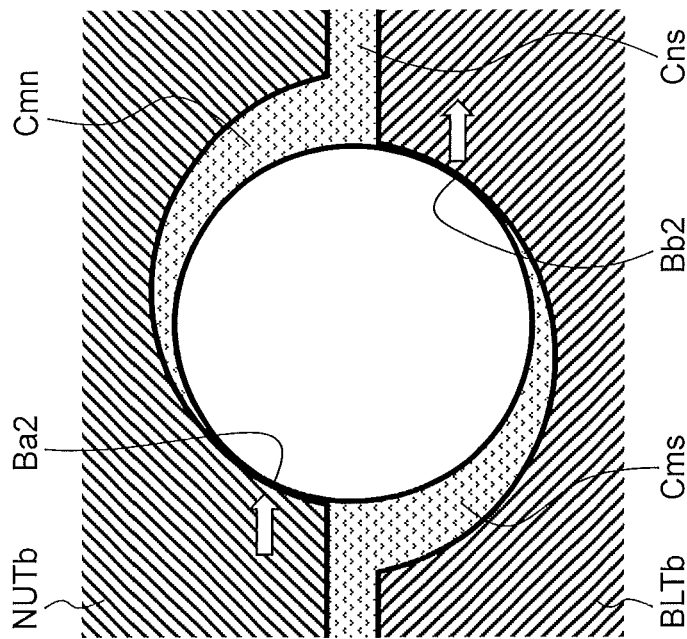
FIG. 8 are diagrams for illustrating a transition of an abutment state between balls and grooves in a case in which a ball screw is used as the screw member.
Figure 8:
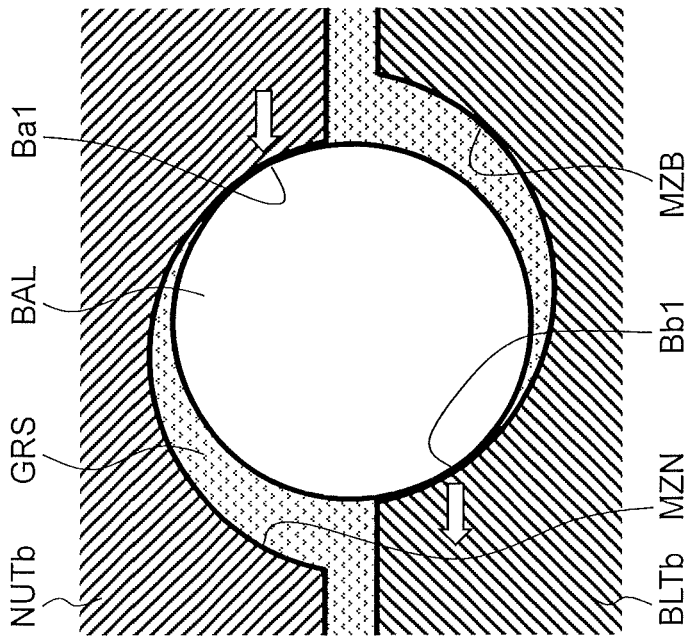

In the above, a description has been given of the case in which the trapezoidal screw is employed as the screw member NJB. In contrast, as illustrated in FIG. 8, a ball screw may be employed as the screw member NJB. Also in the case in which the ball screw is employed, as in the case of the trapezoidal screw, a clearance of the ball screw may function as a flow passage for the lubricant (grease) GRS. Specifically, the movement of the lubricant GRS caused by the volume change of the sealed chamber Hmp is carried out via a clearance Cns (corresponding to Csm and Cso) between a ball screw nut member NUTb (corresponding to the above-mentioned nut member NUT) and the ball screw shaft member BLTb (corresponding to the above-mentioned bolt member BLT), a clearance Cmn (corresponding to Cfk) between a ball groove MZN of NUTb and a ball (steel ball) BAL, and a clearance Cms (corresponding to Cfk) between a ball groove MZB of BLTb and the ball (steel ball) BAL.

Moreover, the abutment parts are switched by the retraction operation as in the case of the trapezoidal screw. FIG. 8(*i*) corresponds to FIG. 5(*a*), and is an illustration of a state (pressing abutment state) in which the pressing member PSN presses the friction member MSB. The ball screw nut member NUTb is rotationally driven by the electric motor MTR, and the ball screw shaft member BLTb fixed to the pressing member PSN is thus caused to carry out a translational motion. In this case, NUTb presses BAL in a direction of the arrow at a first abutment part Ba1, and a force thereof is transmitted to BLTb at a first abutment part Bb1. The first abutment parts Ba1 and Bb1, which are in contact when PSN is pressing MSB, are referred to as "pressure abutment parts during pressing." Moreover, second abutment parts Ba2 and Bb2, which are arranged on the opposite side of the first abutment parts Ba1 and Bb1, and are in contact when the screw is retracted, are referred to as "clearance abutment parts during pressing."

FIG. 8(ii) is a diagram corresponding to FIG. 5(c), and is an illustration of a state in which the screw member NJB is retracted (retraction abutment state). NUTb pushes the ball BAL at the second abutment part Ba2 in a direction opposite to the case of the pressure abutment state, and BAL pushes BLTb at the second abutment part Bb2 with a force thereof. At the beginning of the retraction operation of the screw, as in the case of the trapezoidal screw, the ball BAL enters a free state (free abutment state) in which the ball BAL does not receive the reaction forces from the ball grooves MZN and MZB. The retraction operation of the screw causes the abutment state between the ball (steel ball) BAL and the ball grooves MZN and MZB to gradually change. In other words, also in the ball screw, as in the case of the trapezoidal screw, the state transitions from the pressing abutment state via the free abutment state to the retraction abutment state.

As the functions and effects in the case of the trapezoidal screw, the lubricant (grease) GRS between the ball BAL and the ball grooves MZN and MZB is moved by the transition (for example, the switching of the abutment state) of the abutment state, and the lubrication state between the first abutment parts Ba1 and Bb1 when the braking torque increases is renewed. As in the case of the trapezoidal screw, the supply of new lubricant (grease) to the abutment parts Ba1 and Bb1 starts in the free abutment state, and completes in the retraction abutment state. Thus, the new lubricant GRS may be supplied to the first abutment parts Ba1 and Bb1, which are the pressure abutment parts during the pressing, at least by bringing the ball into the free abutment state.

Moreover, the lubricant GRS existing in parts that are not used in the normal braking operation moves to the screw member NJB by the limit retraction, and hence the lubrication state of the screw member NJB can be secured. Further, if a force continuously applies to the same part on the ball (steel ball) BAL, a fatigue tends to be generated. However, BAL is rolled by the retraction operation, and hence the pressure reception portion may be evenly distributed on the entire BAL, and the durability can thus be increased.

<Functions/Effects>

A description is now given of functions/effects of the embodiment of the present invention. In the vehicle electric braking device according to the present invention, the friction member MSB is pressed with the electric motor MTR against the rotational member KTB fixed to the wheel WHL of the vehicle, to thereby generate the braking torque for the wheel WHL. Then, this device includes:

"the pressing member PSN configured to press the friction member MSB against the rotation member KTB, the pressing member PSN including the first cylindrical part Et1 on the inner periphery thereof;"

"the shaft member SFT to be rotationally driven by the electric motor MTR, the shaft member SFT including, on the outer periphery thereof, the second cylindrical part Et2 overlapping the first cylindrical part Et1 in the axial direction of the shaft member SFT;"

"the screw member NJB configured to convert the rotational motion of the shaft member SFT into the translational motion of the pressing member PSN;"

"the cap member CAP that is brought into slide contact with the first cylindrical part Et1 on the outer periphery of the cap member CAP so that the cap member CAP is relatively movable in the axial direction (Jps direction) of the pressing member PSN with respect to the pressing member PSN, and is brought into slide contact with the second cylindrical part Et2 on the inner periphery of the cap member CAP so that the cap member CAP is relatively movable in the axial direction (Jsf direction) of the shaft member SFT with respect to the shaft member SFT, the cap member CAP being relatively rotatable about the axis (about Jsf) of the shaft member SFT with respect to at least one of the first cylindrical part Et1 or the second cylindrical part Et2;" and "the storage chamber Hch partitioned by the first cylindrical part Et1, the second cylindrical part Et2, and the cap member CAP, connected/communicated to one end Pa2 or Pb2 of the screw member NJB, and filled with the lubricant GRS for lubricating the screw member NJB."

The main reason for the degradation of the lubrication state of the screw member NJB is that gas (air) enters between the abutment parts (for example, the clearance between the flank of the female thread and the flank of the male thread) of the screw member NJB serving to transmit the power, and the lubricant (grease) between the abutment parts is exhausted. Thus, the lubrication state of the screw member NJB may be appropriately maintained by suppressing the entrance of the gas between the abutment parts of the screw member NJB, and supplying sufficient lubricant.

Based on this finding, according to the embodiment of the present invention, the storage chamber Hch, which is the partitioned space for accumulating/accommodating/storing the lubricant (grease) GRS, is provided on the end part of the screw member NJB, and the lubricant GRS is filled in the storage chamber Hch. The storage chamber Hch is partitioned by the cap member CAP that is brought into slide contact with the first cylindrical part (for example, the cylindrical shape) Et1 on the outer periphery, and brought into slide contact with the second cylindrical part (for example, the cylindrical shape) Et2 on the inner periphery. The air of the space (storage chamber Hch) partitioned in this way is removed as much as possible, and the lubricant GRS is then filled in this space.

Therefore, the inflow of the air from the outside of the storage chamber Hch is suppressed. Specifically, the slide contact parts between the cap member CAP and Et1 and Et2 may serve as inflow passages of the gas, and those parts are the cylindrical shapes (shapes including a generatrix) formed by straight lines. In other words, the sealing by means of the surface (surface seal) is carried out, and the surface is formed by the set of the straight lines, and hence the lubricant GRS may be sealed in a highly hermetic manner. It should be noted that, in the seal device described in Patent Literature 3, the sealing is carried out by the ball grooves (that is, the seal part is formed by curves).

Further, the pressing member PSN is moved in the axial (Jps) direction in order to adjust the braking torque. As a result of this movement, the forward movement or the backward movement of the screw member NJB is generated, and the volume change may be generated in the storage chamber Hch. Moreover, the friction members (brake pads) MSB gradually wear when used continuously. The volume change of the storage chamber Hch may be generated also by the wear (decrease in the thickness of the friction members MSB). According to the embodiment of the present invention, the cap member CAP slides in the direction of the axes (Jps and Jsf) with respect to the first cylindrical part (inner peripheral shape of the pressing member PSN) Et1 and the second cylindrical part (outer peripheral shape of the shaft member SFT) Et2, and hence this volume change may be absorbed. As a result, the seal state by the cap member CAP can be satisfactorily maintained over a long period.

Moreover, according to the embodiment of the present invention, the vehicle electric braking device includes:

"the input member INP configured to transmit the rotational motion of the electric motor MTR to the shaft member SFT;" and "the universal joint mechanism UNV configured to absorb the eccentricity among the axes Jin, Jsf, and Jps of the respective members in the input member INP and the pressing member PSN, and transmit the rotational motion of the electric motor MTR to the pressing member PSN." In addition, the universal joint UNV is arranged between the input member INP and the shaft member SFT.

According to the above-mentioned configuration, the possible axial misalignment (eccentricity of the axes) caused by the warp of the caliper CPR, the uneven wear of the friction members (brake pads) MSB, and the like can be absorbed by the universal joint UNV provided between the input member INP and the shaft member SFT. Thus, the axial misalignment between the pressing member PSN and the shaft member SFT cannot be generated. The axis (pressing axis) Jps of PSN and the axis (shaft axis) Jsf of SFT are always coaxial with each other. As a result, the parallelism of the first cylindrical part Et1 and the second cylindrical part Et2 may be maintained, and the smooth slide of the cap member CAP with respect to Et1 and Et2 can thus be secured.

Moreover, according to the embodiment of the present invention, the vehicle electric braking device includes "the sealed chamber Hmp connected/communicated to the screw member NJB on the opposite side of the storage chamber Hch with respect to the screw member NJB, and sealed and filled with the lubricant GRS."

According to the above-mentioned configuration, only the screw member NJB exists in the communication passage between the sealed chamber Hmp from which the gas is removed, and then which is filled with the lubricant GRS and sealed, and the gas parts (parts in which the gas exists). As a result, the inflow of the gas (air) into the screw member NJB is prevented (that is, the gas inflow from the screw member NJB on the sealed chamber Hmp side is prevented, and the possibility of the gas inflow is limited to a periphery of the cap member CAP). As a result, the lubrication state of the screw member NJB can be appropriately maintained.

Moreover, according to the embodiment of the present invention, the slide clearance Csf between the cap member CAP and the second cylindrical part Et2 is larger than the slide clearance Cps between the cap member CAP and the first cylindrical part Et1. Moreover, in the vehicle electric braking device according to the present invention, the cap member CAP is restricted in the rotational motion about the axis (about Jps) of the pressing member PSN.

In order to absorb the volume change in the storage chamber Hch, the cap member CAP slides in the axial direction. However, when the cap member CAP tilts, the slides in the axial direction of the first cylindrical part Et1 and the second cylindrical part Et2 are obstructed. In the above-mentioned configuration, the clearance between the second cylindrical part Et2 and the cap member CAP may be set to be large, to thereby promote the relative motions in the rotational direction (direction about the axis) and the axial direction (direction parallel with the axis). In addition, the clearance between the first cylindrical part Et1 and the cap member CAP may be set to be relatively small, to thereby suppress the tilt of the cap member CAP. Further, the relative rotational motion between the first cylindrical part Et1 and the cap member CAP is restricted by the key member, to thereby suppress the tilt of the cap member CAP.

<Functions/Effects>

A description is now given of functions/effects of the embodiment of the present invention. In the vehicle electric braking device according to the present invention, the friction member MSB is pressed with the electric motor MTR against the rotational member KTB fixed to the wheel WHL of the vehicle, to thereby generate the braking torque for the wheel WHL. Then, this device includes:

"the pressing member PSN configured to press the friction member MSB against the rotation member KTB;"

"the shaft member SFT to be rotationally driven by the electric motor MTR;"

"the screw member NJB configured to convert the rotational motion of the shaft member SFT into the translational motion of the pressing member PSN;" and "the sealed chamber Hmp, which is the sealed space connected/communicated to one end Pb1 of the screw member NJB, the sealed space being filled with the lubricant GRS for lubricating the screw member NJB."

The lubricant GRS moves between the sealed chamber Hmp and the screw member NJB via/through the thread clearance Cfk, Csm, Cso, Cmn, Cms, or Cns of the screw member NJB in response to the rotation of the shaft member SFT.

According to the above-mentioned configuration, the sealed chamber Hmp filled with the lubricant (grease) GRS is provided on the one end part Pb1 of the screw member NJB. When the shaft member SFT is rotated, the rotational motion is converted into the translational motion by the screw member NJB. The translational motion of the screw member NJB generates the volume change (increase or decrease of the volume) of the sealed chamber Hmp. The thread clearances (such as the flank clearance Cfk of the trapezoidal screw and the clearances Cmn and Cms of the ball screw) are formed in the screw member NJB. The lubricant GRS is sealed and filled in the sealed chamber Hmp, and this volume change moves the lubricant GRS inside the screw member NJB. Specifically, when the volume of the sealed chamber Hmp decreases, the lubricant GRS moves from the sealed chamber Hmp to the screw member NJB. Conversely, when the volume of the sealed chamber Hmp increases, the lubricant GRS moves from the screw member NJB to the sealed chamber Hmp. The lubricant is renewed inside the screw member NJB by this movement of the lubricant, and the satisfactory lubrication state of the screw member NJB can be maintained over a long period.

In the embodiment of the present invention, the pressing member PSN has the cup shape, and the pressing member PSN overlaps the shaft member SFT so as to enclose the shaft member SFT. The storage chamber Hch partitioned by the first cylindrical part (inner wall) Et1 of the pressing member PSN is formed at the other end Pb2 of the screw member NJB. The inside of the storage chamber Hch is filled with the lubricant GRS.

According to the above-mentioned configuration, while the lubricant GRS in the screw member NJB is moved by the volume change of the sealed chamber Hmp, the storage chamber Hch filled with GRS is formed at the end part of the screw member NJB on the opposite side of the sealed chamber Hmp. As a result, the inflow of the gas (air) into the screw member NJB can be suppressed. Particularly, when the volume of the sealed chamber Hmp increases, the inflow of the gas from the end part (portion Pb2 or Pa2) of the screw member NJB may be suppressed. Therefore, the exhaustion of the lubricant GRS in the screw member NJB can be prevented.

According to the embodiment of the present invention, the vehicle electric braking device includes "the cap member CAP that is brought into slide contact with the first cylindrical part Et1 on the outer periphery of the cap member CAP so that the cap member CAP is relatively movable in the axial direction (Jps direction) of the pressing member PSN with respect to the pressing member PSN, and is brought into slide contact with the second cylindrical part Et2 on the inner periphery of the cap member CAP so that the cap member CAP is relatively movable in the axial direction (Jsf direction) of the shaft member SFT with respect to the shaft member SFT, the cap member CAP being relatively rotatable about the axis (about Jsf) of the shaft member SFT with respect to at least one of the first cylindrical part Et1 or the second cylindrical part Et2. The storage chamber Hch is covered by the cap member CAP.

According to the above-mentioned configuration, the storage chamber Hch is partitioned by the cap member CAP, and the inflow of the gas from the outside of the storage chamber Hch may thus be suppressed. Specifically, the respective slide contact parts between the cap member CAP, and the inner wall Et1 of PSN and the outer wall Et2 of SFT may serve as the inflow paths of the gas from the gas rooms (portions Pb4 and Pa4), but those portions are formed into the cylindrical shapes (shapes including the generatrix) formed by the straight lines. In other words, the sealing by means of the surface (surface seal) is achieved, and the surface is formed by the set of the straight lines, and hence the lubricant GRS may be sealed in a highly hermetic manner. It should be noted that, in the seal device described in Patent Literature 3, the sealing is achieved by the ball grooves (that is, the seal part is formed by curves).

Moreover, in the embodiment of the present invention, the screw member NJB includes the male thread ONJ and the female thread MNJ, and the flank clearance Cfk between the male thread ONJ and the female thread MNJ is set to be larger than at least one of the crest clearances Csm and Cso of the male thread ONJ and the female thread MNJ.

In the trapezoidal screw including the male thread ONJ and the female thread MNJ, the power is transmitted on the flanks. According to the above-mentioned configuration, the flank clearance Cfk is set to be larger than the crest clearances Csm and Cso, and hence the lubricant GRS is moved mainly via/through the flank clearance Cfk serving as the flow passage owing to the volume change of the sealed chamber Hmp. As a result, the lubricant on the flanks, which are the power transmission surfaces, can be effectively renewed.

Third Embodiment of Braking Means BRK

Figure 9:
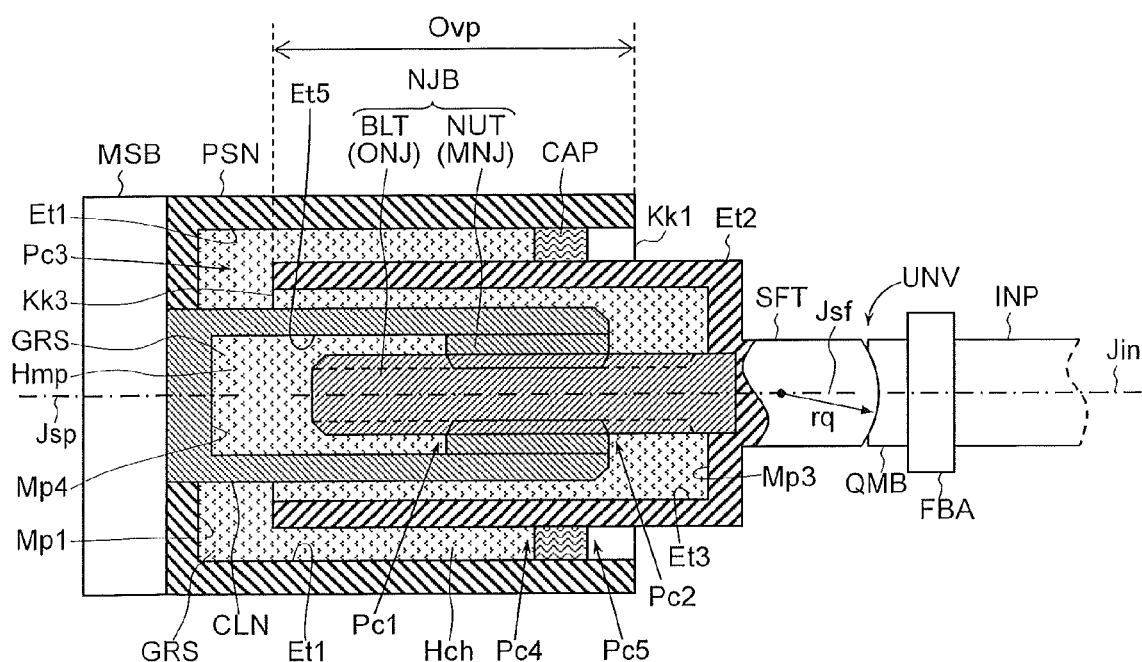
FIG. 9 is a diagram for illustrating a configuration of the braking means illustrated in FIG. 1 according to a third embodiment of the present invention.

Next, referring to FIG. 9, a description is given of a second embodiment of the braking means (brake actuator) BRK on which the above-mentioned overlapping part Ovp is provided. FIG. 9 corresponds to FIG. 2. Therefore, in FIG. 9, members providing the same or equivalent functions as in the members of FIG. 2 are denoted by the same reference numerals as in FIG. 2. In the first embodiment, the bolt member BLT is fixed to the pressing member PSN, and the nut member NUT is fixed to the shaft member SFT, however, in the second embodiment, the nut member NUT is fixed to the pressing member PSN, and the bolt member BLT is fixed to the shaft member SFT.

Specifically, a cylindrical member CLN in a cylindrical shape (cup shape) is fixed to the pressing member PSN, and the nut member NUT is fixed to an inside (inner peripheral part Et5) of the cylinder member CLN. Moreover, the bolt member BLT is fixed to an inside (partition Mp3) of the shaft member SFT coaxially with the axis (shaft axis) Jsf of the shaft member. In addition, the nut member NUT fixed to the pressing member PSN and the bolt member BLT fixed to the shaft member SFT are threadedly engaged with each other, to thereby construct the screw member NJB. On one end part Pc1 of the screw member NJB, the sealed chamber Hmp, from which the gas is removed, and then which is filled with the lubricant GRS and sealed, is formed. In other words, the sealed chamber Hmp is formed into a dead end structure by being partitioned by the inner wall part Et5 and the partition wall Mp4 of the cylindrical member CLN. Therefore, the exits and the entrances of the lubricant GRS inside the sealed chamber Hmp are limited to the clearances (thread clearances) of the screw member NJB.

The volume of the sealed chamber Hmp is changed by the movement of the pressing member PSN with respect to the rotation member KTB, and owing to the change in the volume, the lubricant GRS is moved between the front and rear portions (between the portions Pc1 and Pc2) of the screw member NJB. Specifically, when the pressing member PSN moves forward toward the rotation member KTB, the volume of the sealed chamber Hmp increases, the lubricant GRS flows from the portion Pc2 into the screw member NJB, and flows from the portion Pc1 out to the sealed chamber Hmp. Conversely, when the pressing member PSN moves backward from the rotation member KTB, the volume of the sealed chamber Hmp decreases, and the lubricant GRS flows from the portion Pc1 into the screw member NJB, and moves from the screw member NJB to the portion Pc2. The lubricant GRS in the screw member NJB is moved by the volume change of the sealed chamber Hmp, and the lubricant (grease) GRS is renewed.

Moreover, as illustrated in FIG. 9, as in the first embodiment, the cap member CAP internally in contact with the first cylindrical part Et1 of the pressing member PSN, and externally in contact with the second cylindrical part Et2 of the shaft member SFT may be provided. The storage chamber Hch partitioned by the pressing member PSN (for example, Et1), the screw member NJB, and the cap member CAP, for accumulating the lubricant GRS, is formed.

Also in the third embodiment, the same functions and effects as in the first embodiment are provided. In other words, the part (overlapping part) Ovp in which the pressing member PSN (Et1) and the shaft member SFT (Et2) overlap each other is provided, and hence the path (over which the lubricant GRS is filled) from the screw member NJB to the gas part (part in which the gas exists, portion Pc5) through which the gas passes may be set to be long without extending the overall length of the braking means BRK. Moreover, the end part Pc4 of the storage chamber Hch is partitioned by the cap member CAP, and hence the entrance of the gas into the storage chamber Hch can be suppressed. Further, the sealed chamber Hmp is formed on the end part (portion Pc1) on the opposite side of the storage chamber Hch of the screw member NJB, and hence the lubricant (grease) GRS is renewed via/through the clearance of the screw member NJB by the volume change of the sealed chamber Hmp caused by the braking operation. As a result, the lubrication state of the screw member NJB can be appropriately maintained.

<Functions/Effects>

A description is now given of functions/effects of the embodiment of the present invention. In the vehicle electric braking device according to the present invention, the friction member MSB is pressed with the electric motor MTR against the rotational member KTB fixed to the wheel WHL of the vehicle, to thereby generate the braking torque for the wheel WHL. Then, this device includes:

"the pressing member PSN configured to press the friction member MSB against the rotation member KTB, and including the first cylindrical part Et1 on the inner periphery thereof;"

"the shaft member SFT to be rotationally driven by the electric motor MTR, and including, on the outer periphery thereof, the second cylindrical part Et2 overlapping the first cylindrical part Et1 in the axial direction (Jsf direction) of the shaft member SFT, and including, on the inner periphery thereof, the third cylindrical part Et3;"

"the screw member NJB arranged inside the third cylindrical part Et3, and configured to convert the rotational motion of the shaft member SFT into the translational motion of the pressing member PSN;" and "the storage chamber Hch partitioned by the first cylindrical part Et1 and the second cylindrical part Et2, connected/communicated to one end Pb2 or Pc2 of the screw member NJB, and filled with the lubricant GRS for lubricating the screw member NJB."

The pressing member PSN includes the first cylindrical part Et1 on the inner periphery, and the shaft member SFT includes the second cylindrical part Et2 in the cylindrical shape on the outer periphery. Then, the first cylindrical part Et1 and the second cylindrical part Et2 are inserted into each other so as to oppose each other while having the overlapping part, and the lubricant (grease) GRS is filled therein. In other words, the inner diameter of the first cylindrical part Et1 is longer than the outer diameter of the second cylindrical part Et2, and the respective opening parts Kk1 and Kk3 oppose each other, resulting in the formation of the overlapping part Ovp. Then, the lubricant GRS is filled in the overlapping part Ovp.

The main reason for the degradation of the lubrication state of the screw member NJB is that gas (air) enters between the abutment parts (for example, the clearance between the flank of the female thread and the flank of the male thread) of the screw member NJB serving to transmit the power, and the lubricant (grease) between the abutment parts is exhausted. The embodiment of the present invention is configured so that the shaft member SFT is inserted into a deep part of the pressing member (piston) PSN, to thereby include the overlap (overlapping part). Thus, without extending the overall length of the braking means (brake actuator) BRK, the path (for example, the path from the end part Pb2 of the screw member to the gas part Pb4 for the gas to pass therethrough) for the gas to pass from the screw member NJB to the gas part (the part (space) in which the gas exists such as the part Pb4 or Pc5) may be sufficiently secured. As a result, the entrance of the gas (air) from the gas part to the screw member NJB can be suppressed, and the lubrication of the screw member NJB can be satisfactorily maintained over a long period.

Moreover, according to the embodiment of the present invention, the vehicle electric braking device includes "the cap member CAP that is brought into slide contact with the first cylindrical part Et1 on the outer periphery of the cap member CAP so that the cap member CAP is relatively movable in the axial direction (Jps direction) of the pressing member PSN with respect to the pressing member PSN, and is brought into slide contact with the second cylindrical part Et2 on the inner periphery of the cap member CAP so that the cap member CAP is relatively movable in the axial direction (Jsf direction) of the shaft member SFT with respect to the shaft member SFT, the cap member CAP being relatively rotatable about the axis (about Jsf) of the shaft member SFT with respect to at least one of the first cylindrical part Et1 or the second cylindrical part Et2." The storage chamber Hch is formed by being covered by the cap member CAP.

According to the above-mentioned configuration, the storage chamber Hch is partitioned by the cap member CAP, and the inflow of the gas from the outside of the storage chamber Hch can thus be suppressed. Specifically, the slide contact parts between the cap member CAP and the first and second cylindrical parts Et1 and Et2 may serve as inflow passages of the gas from the gas part (portion Pb4 or Pc5), and those parts are the cylindrical shapes (shapes including a generatrix) formed by straight lines. In other words, the sealing by means of the surface (surface seal) is carried out, the surface is formed by the set of the straight lines, and the lubricant GRS can thus be sealed in a highly hermetic manner. It should be noted that, in the seal device described in Patent Literature 3, the sealing is carried out by the ball grooves (that is, the seal part is formed by curves).

Further, the pressing member PSN is moved in the axial (Jps) direction in order to adjust the braking torque. As a result of this movement, the forward movement or the backward movement of the screw member NJB is generated, and the volume change may be caused in the storage chamber Hch. Moreover, the friction members (brake pads) MSB gradually wear when used continuously. The volume change of the storage chamber Hch may be caused also due to the wear (decrease in the thickness of the friction members MSB). The cap member CAP slides in the axial direction with respect to the first cylindrical part (inner peripheral shape of the pressing member PSN) Et1 and the second cylindrical part (outer peripheral shape of the shaft member SFT) Et2 to enable this volume change to be absorbed, and hence the seal state by the cap member CAP can be satisfactorily maintained.

Moreover, according to the embodiment of the present invention, the vehicle electric braking device includes:

"the input member INP configured to transmit the rotational motion of the electric motor MTR to the shaft member SFT;" and "the universal joint mechanism UNV configured to absorb the eccentricity among the axes Jin, Jsf, and Jps of the respective members in the input member INP and the pressing member PSN, and transmit the rotational motion of the electric motor MTR to the pressing member PSN." The universal joint UNV is arranged between the input member INP and the shaft member SFT.

According to the above-mentioned configuration, the possible axial misalignment (eccentricity of the axes) caused by the warp of CPR, the uneven wear of the friction members (brake pads) MSB, and the like may be absorbed by the universal joint UNV provided between the input member INP and the shaft member SFT. Thus, the axial misalignment between the pressing member PSN and the shaft member SFT may not be generated. The axis (pressing axis) Jps of PSN and the axis (shaft axis) Jsf of SFT are always coaxial. As a result, the parallelism of the first cylindrical part Et1 and the second cylindrical part Et2 are maintained, and the smooth slide of the cap member CAP with respect to Et1 and Et2 can thus be secured.

Moreover, according to the embodiment of the present invention, the vehicle electric braking device includes "the sealed chamber Hmp connected/communicated to the screw member NJB on the opposite side of the storage chamber Hch with respect to the screw member NJB, and sealed and filled with the lubricant GRS."

According to the above-mentioned configuration, only the screw member NJB exists in the communication passage between the sealed chamber Hmp from which the gas is removed and then which is filled with the lubricant GRS and sealed and the gas parts (parts in which the gas exists). As a result, the inflow of the gas (air) into the screw member NJB is prevented (that is, the gas inflow from the sealed chamber Hmp side of the screw member NJB is prevented, and the possibility of the gas inflow is limited to a periphery of the cap member CAP). As a result, the lubrication state of the screw member NJB may be appropriately maintained.

The invention claimed is:

1. A vehicle electric braking device configured to press a friction member using an electric motor against a rotation member fixed to a wheel of a vehicle, to thereby generate a braking torque for the wheel, the vehicle electric braking device comprising:
a pressing member configured to press the friction member against the rotation member, the pressing member including a first cylindrical part on an inner periphery thereof;
a shaft member to be rotationally driven by the electric motor, the shaft member including, on an outer periphery thereof, a second cylindrical part overlapping the first cylindrical part in an axial direction of the shaft member;
a screw member configured to convert a rotational motion of the shaft member into a translational motion of the pressing member;
a cap member that is brought into slide contact with the first cylindrical part on an outer periphery of the cap member so that the cap member is relatively movable in an axial direction of the pressing member with respect to the pressing member, and is brought into slide contact with the second cylindrical part on an inner periphery of the cap member so that the cap member is relatively movable in the axial direction of the shaft member with respect to the shaft member, wherein the cap member being relatively rotatable about an axis of the shaft member with respect to at least one of the first cylindrical part or the second cylindrical part; and
a storage chamber partitioned by the first cylindrical part, the second cylindrical part, and the cap member, connected to one end of the screw member, and filled with a lubricant for lubricating the screw member.

2. A vehicle electric braking device according to claim 1, wherein the pressing member has a cup shape including an internal space that is open on one side in the axial direction and closed on another side in the axial direction, and an inner peripheral surface of a side wall part of the cup shape corresponds to the first cylindrical part,
wherein one end part of the shaft member is arranged in the internal space, and an outer peripheral surface of the one end part of the shaft member corresponds to the second cylindrical part, and
wherein the storage chamber is arranged in the internal space in a region on an opposite side of the opening with respect to the cap member.

3. A vehicle electric braking device configured to press a friction member using an electric motor against a rotation member fixed to a wheel of a vehicle, to thereby generate a braking torque for the wheel, the vehicle electric braking device comprising:
a pressing member configured to press the friction member against the rotation member;
a shaft member to be rotationally driven by the electric motor;
a screw member configured to convert a rotational motion of the shaft member into a translational motion of the pressing member; and
a sealed chamber, which is a sealed space connected to one end of the screw member, the sealed space being filled with a lubricant for lubricating the screw member,
wherein the lubricant moves between the sealed chamber and the screw member via a thread clearance of engaged threads of the screw member so as to absorb volume change of the sealed chamber, which is generated by the rotation of the shaft member.

4. A vehicle electric braking device according to claim 3, wherein the pressing member has a cup shape including an internal space that is open on one side in an axial direction of the pressing member and closed on another side in the axial direction,
wherein one end part of the shaft member is arranged in the internal space, and
wherein the sealed chamber is partitioned by an inner wall surface of the cup shape of the pressing member or a wall surface of the one end part of the shaft member.

5. A vehicle electric braking device configured to press a friction member using an electric motor against a rotation member fixed to a wheel of a vehicle, to thereby generate a braking torque for the wheel, the vehicle electric braking device comprising:
a pressing member configured to press the friction member against the rotation member, and including a first cylindrical part on an inner periphery thereof;
a shaft member to be rotationally driven by the electric motor, and including, on an outer periphery thereof, a second cylindrical part overlapping the first cylindrical part in an axial direction of the shaft member, and on an inner periphery thereof, a third cylindrical part;
a screw member arranged inside the third cylindrical part, and configured to convert a rotational motion of the shaft member into a translational motion of the pressing member; and
a storage chamber partitioned by the first cylindrical part and the second cylindrical part, connected to one end of the screw member, and filled with a lubricant for lubricating the screw member.

6. A vehicle electric braking device according to claim 5, wherein the pressing member has a first cup shape including a first internal space that is open on one side in the axial direction and closed on another side in the axial direction, and an inner peripheral surface of a side wall part of the first cup shape corresponds to the first cylindrical part,
wherein one end part of the shaft member is arranged in the first internal space,
wherein the one end part of the shaft member has a second cup shape including a second internal space that is open at an end part in the axial direction and closed on an opposite side of the end part in the axial direction, and an outer peripheral surface and an inner peripheral surface of a side wall part of the second cup shape respectively correspond to the second cylindrical part and the third cylindrical part,
wherein the storage chamber is arranged in the first internal space,
and
wherein the screw member is arranged in the second internal space.

7. A vehicle electric braking device according to claim 3, wherein the screw member comprises a bolt threadedly engaged with a nut, the bolt fixed to one of the shaft member or the pressing member and the nut fixed to an other of the shaft member or the pressing member.

* * * * *